(12) United States Patent
Wang et al.

(10) Patent No.: US 12,538,262 B2
(45) Date of Patent: Jan. 27, 2026

(54) POSITIONING METHOD, TERMINAL, AND NETWORK-SIDE DEVICE

(71) Applicant: VIVO MOBILE COMMUNICATION CO., LTD., Guangdong (CN)

(72) Inventors: Yuanyuan Wang, Dongguan (CN); Huaming Wu, Dongguan (CN); Ye Si, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 399 days.

(21) Appl. No.: 18/300,849

(22) Filed: Apr. 14, 2023

(65) Prior Publication Data
US 2023/0254811 A1    Aug. 10, 2023

Related U.S. Application Data

(63) Continuation of application No. PCT/CN2021/122971, filed on Oct. 11, 2021.

(30) Foreign Application Priority Data

Oct. 15, 2020 (CN) .......................... 202011106022.8

(51) Int. Cl.
*H04W 64/00* (2009.01)
*H04L 5/00* (2006.01)

(52) U.S. Cl.
CPC ......... *H04W 64/006* (2013.01); *H04L 5/0007* (2013.01); *H04L 5/0051* (2013.01); *H04L 5/0092* (2013.01); *H04L 5/0096* (2013.01)

(58) Field of Classification Search
CPC ... H04W 64/006; H04W 76/28; H04W 64/00; H04W 24/02; H04W 72/23;
(Continued)

(56) References Cited

U.S. PATENT DOCUMENTS 10,368,195 B2   7/2019  Tian et al.
10,440,500 B2  10/2019  Tenny
(Continued)

FOREIGN PATENT DOCUMENTS

CN   106304328 A   1/2017
CN   111417189 A   7/2020
(Continued)

OTHER PUBLICATIONS

International Search Report and Written Opinion of the International Searching Authority regarding International Patent Application No. PCT/CN2021/122971, dated Jan. 14, 2022. Translation provided by Bohui Intellectual Property.
(Continued)

*Primary Examiner* — Nimesh Patel
(74) *Attorney, Agent, or Firm* — Harness, Dickey & Pierce, P.L.C.

(57) ABSTRACT

A positioning method includes: transmitting or receiving, by a terminal, first information; and performing, by the terminal, a positioning operation based on the first information, where the first information includes at least one of the following: configuration information of first positioning reference signals, where the configuration information includes at least one of the following: activation state configuration information, reporting state configuration information, first time domain offset information, second time domain offset information, or configuration information of beam switching or QCL switching; or activation information, where the activation information is used to activate transmission of a first target positioning reference signal, and/or the activation information is used to activate reporting of a second target positioning reference signal, where the first target positioning reference signal includes one or more of the first positioning reference signals, and the
(Continued)

second target positioning reference signal includes one or more of the first positioning reference signals.

20 Claims, 8 Drawing Sheets

(58) Field of Classification Search
CPC .......... H04W 72/0446; H04W 64/003; H04W 72/0453; H04W 76/27; H04W 24/10; H04W 72/232; H04W 16/28; H04W 4/029; H04W 88/02; H04W 88/08; H04W 72/231; H04W 72/30; H04W 72/04; H04W 8/24; H04W 92/18; H04W 72/044; H04W 4/023; H04W 4/025; H04W 52/0206; H04W 72/20; H04W 72/29; H04W 52/0245; H04W 48/12; H04W 52/0251; H04W 52/028; H04W 60/04; H04W 72/25; H04W 72/535; H04W 72/542; H04W 74/006; H04W 88/085; H04W 92/10; H04L 5/0007; H04L 5/0051; H04L 5/0092; H04L 5/0096; H04L 5/0048; H04L 5/0094; H04L 5/0053; H04L 5/0023; H04L 27/2613; H04L 27/2666; H04L 5/001; H04L 27/261; H04L 5/0091; H04L 5/0005; H04L 5/0032; H04L 5/0064; H04L 1/0693; H04L 5/0082; H04L 1/0026; H04L 25/0224; H04L 5/0014; H04L 1/0027; H04L 1/0031; H04L 1/1812; H04L 1/1864; H04L 5/0012; H04L 5/0044; H04L 2101/622; H04L 27/26; H04L 5/0057; H04L 9/40; H04L 1/1893; H04L 5/003; H04L 5/0035; H04L 5/0046; H04L 5/006; H04L 5/02; H04L 5/023; H04L 5/14; H04B 7/0695; H04B 7/0626; H04B 7/0617; H04B 7/088; H04B 7/06968; H04B 7/04; H04B 7/0413; H04B 17/318; H04B 7/08; H04B 7/15528; H04B 7/2606; H04B 17/373; G01S 5/0236; G01S 5/10; G01S 5/0036; G01S 5/0205; G01S 5/0295; G01S 5/0268; G01S 5/14; G01S 1/0428; G01S 1/08; G01S 11/02; G01S 13/74; G01S 5/0027; G01S 5/0054; G01S 5/0072; G01S 5/011; G01S 5/0063; G01S 5/02; G01S 5/0218; G01S 5/0226; G01S 5/0221; G01S 5/02216; G01S 5/0244; Y02D 30/70
See application file for complete search history.

(56) References Cited

U.S. PATENT DOCUMENTS

| | | | |
|---|---|---|---|
| 2013/0294391 A1* | 11/2013 | Guo | H04W 72/23 370/329 |
| 2015/0215884 A1* | 7/2015 | Horvat | G01S 5/10 370/328 |
| 2016/0223639 A1 | 8/2016 | Davydov et al. | |
| 2016/0242054 A1* | 8/2016 | Lee | H04B 17/345 |
| 2017/0347270 A1* | 11/2017 | Iouchi | H04L 5/0098 |
| 2019/0044677 A1* | 2/2019 | Ly | H04B 7/088 |
| 2019/0166452 A1* | 5/2019 | Tenny | G01S 5/14 |
| 2019/0190582 A1* | 6/2019 | Guo | H04B 17/327 |
| 2021/0120522 A1* | 4/2021 | Kim | H04W 4/02 |
| 2021/0352613 A1* | 11/2021 | Yoon | H04W 56/001 |
| 2022/0150866 A1 | 5/2022 | Ren et al. | |

FOREIGN PATENT DOCUMENTS

| | | |
|---|---|---|
| CN | 111448834 A | 7/2020 |
| CN | 111562546 A | 8/2020 |
| WO | WO-2020101266 A1 | 5/2020 |
| WO | WO-2020193853 A1 | 10/2020 |
| WO | WO-2020205891 A1 | 10/2020 |

OTHER PUBLICATIONS

"Combined Downlink and Uplink NR Positioning Procedures," Qualcomm Incorporated, 3GPP TSG-RAN WG2 Meeting #104, R2-1817899, dated Nov. 16, 2018.
Partial Supplementary European Search Report regarding European Patent Application No. 21879318.0, dated May 21, 2024.
Third Office Action regarding Chinese Patent Application No. 202011106022.8, dated May 29, 2024. Translation provided by Bohui Intellectual Property.
Extended European Search Report regarding European Patent Application No. 21879318.0 dated Sep. 25, 2024.
Qualcomm Incorporated, "Stage 2 for Multi-RTT Positioning", Document R2-1915558, 3GPP TSG-RAN WG2 Meeting #108, Nov. 18-22, 2019.
"5G; NR; Physical Layer Procedures for Data (3GPP TS 38.214 version 15.10.0 Release 15)", ETSI TS 138 214 V15.10.0, Jul. 2020.
First Office Action regarding Chinese Patent Application No. 202011106022.8, dated Jun. 27, 2023. Translation provided by Bohui Intellectual Property.
Second Office Action regarding Chinese Patent Application No. 202011106022.8, dated Mar. 3, 2024. Translation provided by Bohui Intellectual Property.
First Office Action regarding Japanese Patent Application No. 2023-523290, dated Mar. 21, 2024.
Qualcomm Incorporated, "Combined Downlink and Uplink NR Positioning Procedures", Document R2-1817899, 3GPP TSG-RAN WG2 Meeting #104, Nov. 12-16, 2018.
Nokia et al., "On-Demand PRS Transmission and Dynamic PRS Resource Allocation", Document R2-2007128, 3GPP TSG-RAN WG2 Meeting #111 Electronic, Aug. 17-28, 2020.

* cited by examiner

POSITIONING METHOD, TERMINAL, AND NETWORK-SIDE DEVICE

CROSS-REFERENCE TO RELATED APPLICATIONS

This application is a Bypass Continuation application of PCT/CN2021/122971, filed on Oct. 11, 2021, which claims priority to Chinese Patent Application No. 202011106022.8, filed on Oct. 15, 2020, which are incorporated herein by reference in their entirety.

TECHNICAL FIELD

This application pertains to the field of wireless communications technologies, and specifically relates to a positioning method, a terminal, and a network-side device.

BACKGROUND

In wireless communications systems, for example, R16 wireless communications systems, only periodic positioning reference signals (PRS) are supported, and for PRS measurement results, only higher-layer measurement requests based on an LTE positioning protocol (LPP) are supported for performance of periodic reporting or reporting per request. Moreover, all request and measurement interaction of PRS is between a terminal and a location management function (LMF).

To meet the requirement for low latency, aperiodic, semi-static, or on-demand PRS needs to be implemented. However, currently no solution which supports implementation of aperiodic PRS, semi-static PRS, or on-demand PRS is yet available.

SUMMARY

Embodiments of this application provide a positioning method, a terminal, and a network-side device.

According to a first aspect, a positioning method is provided. The method includes: transmitting or receiving, by a terminal, first information; and performing, by the terminal, a positioning operation based on the first information, where the first information includes at least one of the following: configuration information of first positioning reference signals, where the configuration information includes at least one of the following: activation state configuration information, reporting state configuration information, first time domain offset information, second time domain offset information, or configuration information of beam switching or QCL switching; or activation information, where the activation information is used to activate transmission of a first target positioning reference signal, and/or the activation information is used to activate reporting of a second target positioning reference signal, where the first target positioning reference signal includes one or more of the first positioning reference signals, and the second target positioning reference signal includes one or more of the first positioning reference signals.

According to a second aspect, a positioning apparatus is provided, including: a transceiver module, configured to transmit or receive first information; and an execution module, configured to perform a positioning operation based on the first information, where the first information includes at least one of the following: configuration information of first positioning reference signals, where the configuration information includes at least one of the following: activation state configuration information, reporting state configuration information, first time domain offset information, second time domain offset information, or configuration information of beam switching or QCL switching; or activation information, where the activation information is used to activate transmission of a first target positioning reference signal, and/or the activation information is used to activate reporting of a second target positioning reference signal, where the first target positioning reference signal includes one or more of the first positioning reference signals, and the second target positioning reference signal includes one or more of the first positioning reference signals.

According to a third aspect, a positioning method is provided. The method includes: transmitting or receiving, by a network-side device, first information; and transmitting, by the network-side device based on the first information, a first target positioning reference signal to a terminal, where the first information includes at least one of the following: configuration information of first positioning reference signals, where the configuration information includes at least one of the following: activation state configuration information, reporting state configuration information, first time domain offset information, second time domain offset information, or configuration information of beam switching or QCL switching; or activation information, for activating transmission of the first target positioning reference signal, and/or for activating reporting of a second target positioning reference signal, where the first target positioning reference signal includes one or more of the first positioning reference signals, and the second target positioning reference signal includes one or more of the first positioning reference signals.

According to a fourth aspect, a positioning apparatus is provided, including: a second transceiver module, configured to transmit or receive first information; and a transmitting module, configured to transmit a first target positioning reference signal to a terminal based on the first information, where the first information includes at least one of the following: configuration information of first positioning reference signals, where the configuration information includes at least one of the following: activation state configuration information, reporting state configuration information, first time domain offset information, second time domain offset information, or configuration information of beam switching or QCL switching; or activation information, for activating transmission of the first target positioning reference signal, and/or for activating reporting of a second target positioning reference signal, where the first target positioning reference signal includes one or more of the first positioning reference signals, and the second target positioning reference signal includes one or more of the first positioning reference signals.

According to a fifth aspect, a terminal is provided, where the terminal includes a processor, a memory, and a program or instructions stored in the memory and executable on the processor, where when the program or instructions are executed by the processor, the steps of the foregoing method according to the first aspect are implemented.

According to a sixth aspect, a network-side device is provided, where the network-side device includes a processor, a memory, and a program or instructions stored in the memory and executable on the processor, where when the program or instructions are executed by the processor, the steps of the foregoing method according to the third aspect are implemented.

According to a seventh aspect, a non-transitory readable storage medium is provided, where the non-transitory readable storage medium stores a program or instructions, and when the program or instructions are executed by a processor, the steps of the method according to the first aspect are implemented, or the steps of the method according to the third aspect are implemented.

According to an eighth aspect, a chip is provided, where the chip includes a processor and a communications interface, the communications interface is coupled to the processor, and the processor is configured to run a terminal program or instructions to implement the method according to the first aspect, or the processor is configured to run a network-side device program or instructions to implement the method according to the third aspect.

According to a ninth aspect, a computer program product is provided, where the computer program product includes a processor, a memory, and a program or instructions stored in the memory and executable on the processor, where when the program or instructions are executed by the processor, the steps of the method according to the first aspect are implemented, or the steps of the method according to the third aspect are implemented.

DETAILED DESCRIPTION

The following clearly describes the technical solutions in the embodiments of this application with reference to the accompanying drawings in the embodiments of this application. Apparently, the described embodiments are some rather than all embodiments of this application. All other embodiments obtained by persons of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates an "or" relationship between the associated objects.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably. The technology described may be used in the above-mentioned systems and radio technologies as well as other systems and radio technologies. In the following descriptions, a new radio (NR) system is described for illustrative purposes, and NR terms are used in most of the following descriptions, although these technologies may also be applied to other applications than the NR system application, for example, sixth generation (6G) communications systems.

Figure 1:
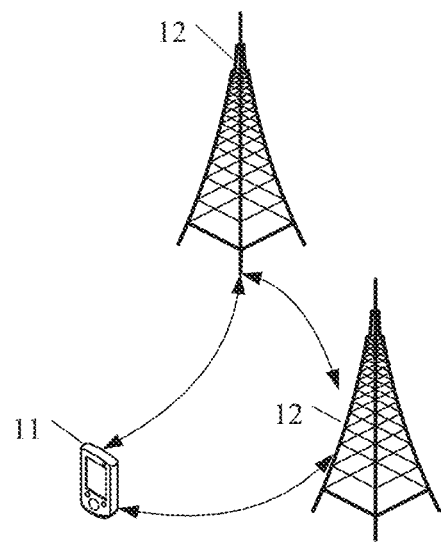
FIG. 1 is a block diagram of a wireless communications system to which an embodiment of this application is applicable.

FIG. 1 is a block diagram of a wireless communications system to which an embodiment of this application is applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile internet device (MID), a wearable device or vehicular user equipment (VUE), or a pedestrian user equipment (PUE). The wearable device includes wristbands, earphones, glasses, and the like. It should be noted that the terminal 11 is not limited to any specific type in the embodiments of this application. It should be noted that in a special case, the terminal device 11 may also be the network-side device 12, in which case the present application can be understood as a communications system between base stations or a communications system between base stations and core networks. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a Node B, an evolved B node (eNB), a home NodeB, a home evolved NodeB, a WLAN access point, a Wi-Fi node, a transmission reception point (TRP), or another appropriate term in the art. As long as same technical effects are achieved, the base station is not limited to any specific technical term. It should be noted that the base station in the NR system is taken only as an example in the embodiments of this application, and the base station is not limited to any specific type. The core network device includes but is not limited to a location management device or a location server such as E-SMLC, LMF, or other devices with same functions.

The following describes in detail a positioning method provided in the embodiments of this application by using embodiments and application scenarios thereof with reference to the accompanying drawings.

Figure 2:
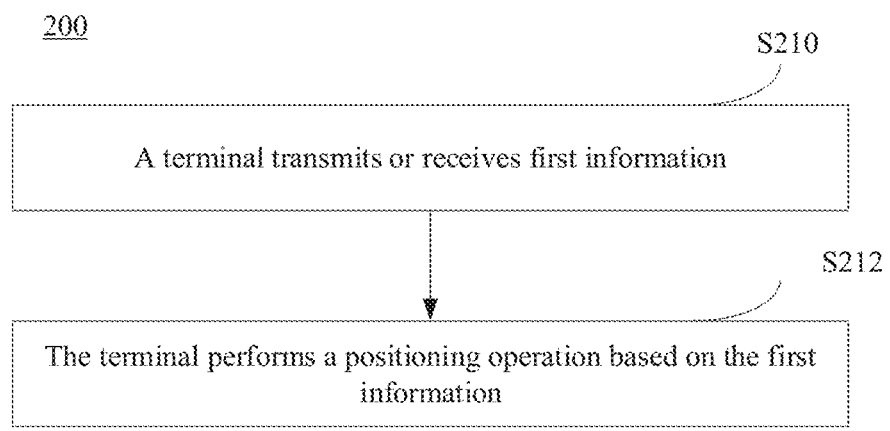
FIG. 2 is a schematic flowchart of a positioning method according to an embodiment of this application.

FIG. 2 is a schematic flowchart of a positioning method in an embodiment of this application. The method 200 may be performed by a terminal. In other words, the method may be performed by software or hardware installed in the terminal. As shown in FIG. 2, the method may include the following steps.

S210. A terminal transmits or receives first information.

In this embodiment of this application, the first information includes: configuration information of first positioning reference signals and/or activation information. The configuration information includes at least one of the following: activation state configuration information, reporting state configuration information, first time domain offset information, second time domain offset information, or configuration information of beam switching or quasi co-location (QCL) switching. The activation information is used to activate transmission of the first target positioning reference signal, and/or to activate reporting of a second target positioning reference signal, where the first target positioning reference signal includes one or more of the first positioning reference signals, and the second target positioning reference signal includes one or more of the first positioning reference signals.

In this embodiment of this application, the first positioning reference signal is a positioning reference signal configured by a network-side device for the terminal, including but not limited to: PRS, sounding reference signal (SRS), channel state information reference signal (CSI-RS), tracking reference signal (TRS), and synchronization signal and physical broadcast channel signal block (or synchronization signal block) (Synchronization Signal and PBCH Block, SSB).

In this embodiment, the first positioning reference signal may include a plurality of positioning reference signals or a plurality of types of positioning reference signals, and the first target positioning reference signal activated by the activation information may be one or more positioning reference signals in the first positioning reference signal. The second target positioning reference signal may be one or more positioning reference signals in the first positioning reference signal, where the first target positioning reference signal and the second target positioning reference signal may be the same or different, that is, a positioning reference signal activated by the activation information for transmission and a positioning reference signal activated by the activation information for reporting may be the same or different. For example, according to specific requirements, the network-side device may activate transmission of 5 positioning reference signals in the first positioning reference signals and activate reporting of 3 positioning reference signals in the 5 positioning reference signals. Activation information for activating transmission of positioning reference signals and that for activating reporting of a positioning reference signal may be one or more pieces of activation information, and may be a same type or different types of activation information.

S212. The terminal performs a positioning operation based on the first information.

In a possible implementation, the activation state configuration information may include at least one of the following (1) to (3).

(1) At least one piece of first activation state information, where one piece of the first activation state information is associated with one or more first positioning reference signal groups, where the first positioning reference signal group includes at least one positioning reference signal in the first positioning reference signals.

That is, in this possible implementation, one piece of first activation state information is associated with one or more first positioning reference signal groups. For example, in this possible implementation, one piece of the first activation state information is associated with one first positioning reference signal group, and one first positioning reference signal group includes one or more first positioning reference signals. The first activation state information being activated may indicate that all first positioning signals of the first positioning reference signal group are activated, or may indicate that one first positioning reference signal of the first positioning reference signal group or a specific first positioning reference signal is activated.

In another possible implementation, one piece of the first activation state information is associated with a plurality of first positioning reference signal groups, and each first positioning reference signal group includes one or more first positioning reference signals. The first activation state information is activated, which may indicate that the plurality of first positioning reference signal groups are activated, or may indicate that the one first positioning reference signal group is activated or that one or more specific first positioning reference signal groups are activated. There may alternatively be one or more first positioning signals of the activated first positioning reference signal group.

In addition, in this possible implementation, the association between one piece of first activation state information and one or more first positioning reference signal groups further includes: group ID information of the first positioning reference signal group being included in the first activation state information. There may be N pieces of first activation state information, each with a value representing one first activation state. Group ID information of first positioning reference signal group contained in each piece of the first activation state information may be the same or different. In other words, one first positioning reference signal group may be associated with one or more pieces of first activation state information.

(2) At least one piece of first activation state information, where one piece of the first activation state information is associated with first positioning reference signals of one or more first unit resources, where the first unit resource includes at least the following: a positioning reference signal resource, a positioning reference signal resource set, a positioning reference signal resource corresponding to one TRP, and a positioning reference signal resource corresponding to one frequency layer.

That is, in this possible implementation, each first unit resource is configured with one piece of first activation state information, and when one piece of the first activation state information is indicated in the activation information, a positioning reference signal corresponding to the first unit resource associated with the first activation state information is activated. For example, the first activation state information may be a specific value, such as 0, 1, 2, or 3, where a first unit resource associated with 0 is a positioning reference signal resource corresponding to a positioning reference signal resource set (resource set) a, a first unit resource associated with 1 is a positioning reference signal resource corresponding to a resource set b, a first unit resource associated with 2 is a positioning reference signal resource corresponding to resource set c, and a first unit resource associated with 3 is a positioning reference signal resource corresponding to resource set d. Then, if downlink control information (DCI) indicates that a value of the first activation state information is 1, it means that the positioning reference signal corresponding to resource set b is activated.

In another possible implementation, each first unit resource is configured with one piece of first activation state information so that a plurality of first unit resources may correspond to a same piece of first activation state information. When the activation information indicates that one piece of the first activation state information is to be activated, one or a specific first positioning reference signal corresponding to the first unit resource associated with the first activation state information may be activated, or all first positioning reference signals corresponding to the first unit resource associated with the first activation state information may be activated. For example, the first activation state information may be a specific value, such as 0, 1, 2, or 3, where a first unit resource associated with 0 is a positioning reference signal resource set (resource set) a1, positioning reference signal resource set (resource set) a2, and positioning reference signal resource set (resource set) a3; a first unit resource associated with 1 is resource set b1, resource set b2, and resource set b3; a first unit resource associated with 2 is a positioning reference signal resource corresponding to resource set c; and a first unit resource associated with 3 is a positioning reference signal resource corresponding to resource set d. Then, if downlink control information (DCI) indicates that a value of the first activation state information is 1, it may indicate that the resource set b1, resource set b2, and resource set b3 are activated, or according to a protocol or other configuration signaling, one resource set may be activated, for example, the resource set b1, or more resource sets may be activated, for example, the resource set b1 and the resource set b2.

(3) At least one first activation state list, where the first activation state list is used to record an association relationship between the first activation state information and the first positioning reference signal group.

In this possible implementation, the first activation state information is a list, and each member of the list is associated with one or more first positioning reference signal groups. Each member in the list indicates one piece of first activation state information and may be a specific value or an ID, which is not specifically limited in this embodiment of this application. One or more first positioning reference signal groups associated with each member may be indicated by a positioning reference signal group ID, or may alternatively be indicated by an ID for one or a group of first unit resources.

For example, optionally, one or more first positioning reference signal groups may be associated with one or a group of first settings, where the first setting may include a positioning reference signal reporting setting and/or a positioning reference signal resource setting.

In a possible implementation, one of the first positioning reference signal groups or the first activation state list may further include configuration information of a third positioning reference signal group and/or identification information, where the third positioning reference signal group is a subset of the first positioning reference signal group, that is, the third positioning reference signal group may include some or all positioning reference signals in the first positioning reference signal group.

In this possible implementation, the identification information may be identification information of the first positioning reference signal group. For example, the first activation state list records identification information of one or more positioning reference signal groups associated with one member. Or, the identification information may alternatively be identification information of the third positioning reference signal group. For example, an entry is added to the first activation state list to record the identification information of the third positioning reference signal group, or, the identification information of the third positioning reference signal group is added to the configuration information of the first positioning reference signal group. Or, the identification information may further be identification information of the first positioning reference signal group and a second positioning reference signal group. For example, identification information of one or more associated first positioning reference signal groups and identification information of a third positioning reference signal group of a corresponding first positioning reference signal group are recorded for each member of the list in the first activation state list. Or, when one piece of first activation state information is associated with one or more first positioning reference signal groups, and a first positioning reference signal group is associated with one or a group of positioning reference signal reporting settings and/or positioning reference signal resource settings, the identification information may further indicate that the first activation state information is for activating identification information of a specific positioning reference signal in one or a group of associated positioning reference signal reporting settings and/or positioning reference signal resource settings. Or, when one piece of first activation state information is associated with one first positioning reference signal group, the identification information may be an ID for one or a specific positioning reference signal of the first positioning reference signal group; or, when one piece of the first activation state information is associated with a plurality of first positioning reference signal groups, the identification information may be one or a specific first positioning reference signal group ID; where, in an embodiment, the one or specific first positioning reference signal group or the one or the specific first positioning reference signal belongs to or includes the third positioning reference signal group.

In this possible implementation, configuration information of the third positioning reference signal group may be corresponding positioning reference signal resource information, configuration window or the like of the third positioning reference signal group, and the terminal may determine, based on the third positioning reference signal group, a resource for monitoring the third positioning reference signal group. It should be noted that determining the resources for monitoring the third positioning reference signal group may be understood as determining a positioning reference signal of the third positioning reference signal group, or determining configuration information of the third positioning reference signal group, or determining how to monitor signals of the third positioning reference signal group. Such understanding may also be used for other similar descriptions.

In addition, the configuration information of the third positioning reference signal group may include at least one of the following: period; muting parameter; number of repetitions; offset within a period; bandwidth information;

frequency domain offset information; time information; spatial direction indication information; transmission configuration indicator (TCI) indication information; quasi-co-location (QCL) indication information; beam indication information; power information; MG configuration information; type of positioning reference signal; BWP information; transmission; stop of transmission; activation/deactivation flag; numerology; or time offset information (for example, a cell time offset and/or a TRP time offset). The terminal monitors the third positioning reference signal according to the configuration information of the third positioning reference signal group.

In another possible implementation, the third positioning reference signal group is equal to the first positioning reference signal group, and the terminal determines, according to the configuration information of the third positioning reference signal group, to monitor signals in the first positioning reference signal group.

For example, if the configuration information is a configuration window of the third positioning reference signal group, the terminal may monitor the positioning reference signals in the third positioning reference signal group from different TRPs on a time domain resource corresponding to the configuration window, so as to quickly detect positioning reference signals in the third positioning reference signal group from different TRPs.

Alternatively, the configuration information of the third positioning reference signal group may include at least one of the following:
- a window length of the configuration window;
- time domain offset information and/or period information of the configuration window; or
- configuration information of a positioning reference signal of the third positioning reference signal group relative to the configuration window; for example, an offset of a starting location of the third positioning reference signal relative to the configuration window, or a time offset of the third positioning reference signal relative to a starting location of a configuration window calculated according to a window length, or other configuration information described above, such as a signal period and a muting parameter.

When one piece of first activation state information is associated with one or more first positioning reference signal groups and the first positioning reference signal is associated with one or a group of positioning reference signal reporting settings and/or positioning reference signal resource settings, during activation, a specific positioning reference signal may be selected from one or a group of positioning reference signal reporting settings and/or positioning reference signal resource settings for activation, that is, a specific positioning reference signal resource set, a positioning reference signal corresponding to a specific frequency layer, or a positioning reference signal corresponding to a specific positioning reference signal resource, or the like is selected from a positioning reference signal reporting setting and/or positioning reference signal resource setting associated with one piece of the first activation state information. A specific positioning reference signal may alternatively be indicated by the identification information included in one first positioning reference signal group or third positioning reference signal group or first activation state list described above, or may be indicated by higher-layer signaling or a protocol.

For example, if one or a group of positioning reference signal reporting settings and/or positioning reference signal resource settings include a plurality of positioning reference signal resource sets (set) or a plurality of positioning reference signal resources (resource) or a plurality of frequency layers of one TRP, the network-side device may only activate one or part of the positioning reference signal resource set/positioning reference signal resource/frequency layer for transmission/reporting. For example, higher-layer signaling is used to indicate specifically which specific positioning reference signal is to be activated, that is, to indicate a specific positioning reference signal resource set/positioning reference signal resource/frequency layer.

For another example, if one or a group of positioning reference signal reporting settings and/or positioning reference signal resource settings include one or more positioning reference signal resource sets (set) or one or more positioning reference signal resources (resource) or one or more frequency layers of a plurality of TRPs, the network-side device may activate only a specific, some, or all of the TRPs. However, high-layer signaling or requirements may be used to indicate which set, resource, or frequency layer or a set, resource, or frequency layer of which nature to be activated specifically for the positioning reference signal resource set/positioning reference signal resource/frequency layer.

For another example, when one piece of first activation state information is associated with one or more first positioning reference signal groups and the first positioning reference signal group is associated with one or a group of positioning reference signal reporting settings and/or positioning reference signal resource settings, all positioning signals in the positioning reference signal reporting setting or positioning reference signal setting may be activated by one piece of activation signaling.

In the foregoing possible implementation, the specific positioning reference signal may be one of the following: an aperiodic positioning reference signal, a semi-static positioning reference signal, and an on-demand positioning reference signal. The on-demand positioning reference signal may be an aperiodic positioning reference signal or a semi-static positioning reference signal, which is not specifically limited in this embodiment.

In addition, in the foregoing possible implementation, the specific positioning reference signal may alternatively be one or a group of positioning reference signals, and the group of PRSs (which may be referred to as a trigger group) may have at least one of the following characteristics:
- having a same time domain type (periodic, aperiodic, or semi-static);
- having a same BWP ID;
- having a same frequency layer;
- having a same time domain parameter, where the time domain parameter may include at least one of the following: period, slot offset (slot offset), muting parameter (muting), or number of repetitions (repetition);
- belonging to a same positioning reference signal resource set;
- belonging to a same active group setting;
- having a same group ID (group ID);
- having a same resource parameter, where the resource parameter includes at least one of the following: beam (beam), beam group (beam group), resource set ID (resource set ID), resource ID (resource ID), and QCL information;
- belonging to one or more first unit resources, where the first unit resource includes one of the following: a positioning reference signal resource, a positioning reference signal resource set, a positioning reference signal resource corresponding to one TRP (which may also be referred to as one TRP), and a positioning reference signal resource corresponding to one frequency layer (which may also be referred to as one frequency layer);

having a same reporting type;
having a same reporting configuration;
having a same measurement type;
having a same measurement configuration;
belonging to a same reporting group; or
belonging to a same measurement group.

In a possible implementation, similar to the activation state configuration information, the reporting state configuration information may include at least one of the following (1) to (3).

(1) At least one piece of second activation state information, where one piece of the second activation state information is associated with one or more second positioning reference signal groups, where the second positioning reference signal group includes at least one positioning reference signal in the first positioning reference signals.

That is, in this possible implementation, one piece of second activation state information is associated with one or more second positioning reference signal groups. For example, in this possible implementation, one piece of the second activation state information is associated with one second positioning reference signal group, and one second positioning reference signal group includes one or more of the first positioning reference signals. The second activation state information being activated may indicate that all first positioning signals of the second positioning reference signal group are activated, or may indicate that one first positioning reference signal of the second positioning reference signal group or a specific first positioning reference signal is activated for reporting.

In another possible implementation, one piece of the second activation state information is associated with a plurality of second positioning reference signal groups, and each second positioning reference signal group includes one or more first positioning reference signals. The second activation state information being activated may indicate that the plurality of second positioning reference signal groups are activated for reporting, or may indicate that the one second positioning reference signal group is activated for reporting or that specific one or more second positioning reference signal groups are activated for reporting. There may alternatively be one or more first positioning signals of the activated second positioning reference signal group.

In addition, in this possible implementation, the association between one piece of second activation state information and one or more second positioning reference signal groups further includes: group ID information of the second positioning reference signal group being included in the second activation state information. There may be N pieces of second activation state information, each with a value representing one second activation state. Group ID information of a second positioning reference signal group contained in each piece of the second activation state information may be the same or different. In other words, one second positioning reference signal group may be associated with one or more pieces of second activation state information.

For example, there may be N pieces of second activation state information, each with a value representing one piece of second activation state, and positioning reference signals with same second activation state information may be triggered simultaneously for reporting and/or be simultaneously configured with a report resource, for example, may be triggered by a "PRS-request" or "PRS report request".

For another example, in some scenarios, second activation state information and first activation state information are present, but in some scenarios, the second activation state information serves as both the second activation state information and the first activation state information. For example, the second activation state information may be used to indicate state information of transmission of an aperiodic positioning reference signal, and may also be used to indicate state information of aperiodic positioning reference signal reporting.

In a possible embodiment, the second positioning reference signal group may be a group of positioning reference signals that need to be reported in a corresponding activation state, or it may be the first positioning reference signal group, that is, a group of positioning reference signals that need to be transmitted in a corresponding activation state.

(2) At least one piece of second activation state information, where one piece of the second activation state information is associated with first positioning reference signals corresponding to one or more of the first unit resources.

For example, each first unit resource may be configured with one piece of second activation state information. In this case, the second activation state information may be a specific value, such as 0, 1, 2, or 3. For example, a corresponding value for a field corresponding to the second activation state information in the DCI indicates that a positioning reference signal corresponding to a first unit resource associated with the value is activated for reporting. Being activated for reporting may be understood that being activated for reporting or being activated for reporting and transmission, and similar understandings are applicable to other places in this embodiment of this application.

In another possible implementation, each first unit resource is configured with one piece of second activation state information so that a plurality of first unit resources may correspond to one piece of second activation state information. When the activation information indicates that one piece of the second activation state information is to be activated, one or a specific first positioning reference signal corresponding to the first unit resource associated with the second activation state information may be activated, or all first positioning reference signals corresponding to the first unit resource associated with the second activation state information may be activated. For example, the second activation state information may be a specific value, such as 0, 1, 2, or 3, where a first unit resource associated with 0 is positioning reference signal resource set (resource set) a1, positioning reference signal resource set (resource set) a2, and positioning reference signal resource set (resource set) a3; a first unit resource associated with 1 is resource set b1, resource set b2, and resource set b3; a first unit resource associated with 2 is a positioning reference signal resource corresponding to resource set c; and a first unit resource associated with 3 is a positioning reference signal resource corresponding to resource set d. Then, if downlink control information (DCI) indicates that a value of the second activation state information is 1, it indicates that resource set b1, resource set b2, and resource set b3 are activated, or according to a protocol or other configuration signaling, one resource set is activated, for example, resource set b1, or more resource sets are activated, for example, resource set b1 and resource set b2.

(3) At least one second activation state list, where the second activation state list is used to record an association relationship between the second activation state information and the second positioning reference signal group.

In this possible implementation, each member of a second activation state list is associated with one or more second positioning reference signal groups. Optionally, one second positioning reference signal group may be associated with one or more second settings, and the second setting is associated with one or a group of the first settings.

In a possible implementation, one of the second positioning reference signal groups or the second activation state list may further include configuration information of a fourth positioning reference signal group and/or identification information, where the fourth positioning reference signal group is a subset of the second positioning reference signal group, that is, the fourth positioning reference signal group may include some or all of the positioning reference signals in the second positioning reference signal group.

In this possible implementation, the identification information may be identification information of the second positioning reference signal group. For example, the second activation state list records identification information of one or more positioning reference signal groups associated with one member. Or, the identification information may alternatively be identification information of the fourth positioning reference signal group. For example, an entry is added to the second activation state list to record the identification information of the fourth positioning reference signal group, or, the identification information of the fourth positioning reference signal group is added to the configuration information of the second positioning reference signal group. Or, the identification information may also be identification information of the second positioning reference signal group and identification information of the fourth positioning reference signal group. For example, identification information of one or more associated second positioning reference signal groups and identification information of a fourth positioning reference signal group of a corresponding second positioning reference signal group are recorded for each member of the list in the second activation state list. Or, when one piece of second activation state information is associated with one or more second positioning reference signal groups, and a second positioning reference signal group is associated with one or a group of positioning reference signal reporting settings and/or positioning reference signal resource settings, the identification information may further indicate identification information of a specific positioning reference signal in one or a group of positioning reference signal reporting settings and/or positioning reference signal resource settings associated with activation of the second activation state information. Or, when one piece of second activation state information is associated with a second positioning reference signal group, the identification information may be an ID for one or a specific positioning reference signal of the second positioning reference signal group; or, when one piece of the second activation state information is associated with a plurality of second positioning reference signal groups, the identification information may be one or a specific second positioning reference signal group ID; where, in an embodiment, the one or specific second positioning reference signal group or the one or the specific first positioning reference signal belongs to or includes the fourth positioning reference signal group.

In this possible implementation, configuration information of the fourth positioning reference signal group may be corresponding positioning reference signal resource information or configuration window or the like of the fourth positioning reference signal group, and the terminal may determine, based on the fourth positioning reference signal group, a resource for monitoring the fourth positioning reference signal group. It should be noted that determining the resources for monitoring the fourth positioning reference signal group may be understood as determining a positioning reference signal of the fourth positioning reference signal group, or determining configuration information of the fourth positioning reference signal group, or determining how to monitor signals of the fourth positioning reference signal group. Such understanding may also be used for other similar descriptions.

In addition, the configuration information of the fourth positioning reference signal group may include at least one of the following: period; muting parameter; number of repetitions; offset within a period; bandwidth information; frequency domain offset information; time information; spatial direction indication information; transmission configuration indicator (TCI) indication information; quasi-co-location (QCL) indication information; beam indication information; power information; MG configuration information; type of positioning reference signal; BWP information; transmission; stop of transmission; activation/deactivation flag; numerology; or time offset information (for example, a cell time offset and/or a TRP time offset). The terminal monitors the fourth positioning reference signal according to the configuration information of the fourth positioning reference signal group.

In another possible implementation solution, the fourth positioning reference signal group is equal to the second positioning reference signal group, and the terminal determines, according to the configuration information of the fourth positioning reference signal group, to monitor signals in the second positioning reference signal group.

For example, if the configuration information is a configuration window of the fourth positioning reference signal group, the terminal may monitor the positioning reference signals in the fourth positioning reference signal group from different TRPs on a time domain resource corresponding to the configuration window, so as to quickly detect positioning reference signals in the fourth positioning reference signal group from different TRPs. For another example, if the configuration information is a configuration window of the fourth positioning reference signal group, the terminal may transmit a measurement result of the fourth positioning reference signal group or the second positioning reference signal group on the time domain resource corresponding to the configuration window.

Or, the configuration information of the fourth positioning reference signal group may include at least one of the following:
   a window length of the configuration window;
   time domain offset information and/or period information of the configuration window; or
   configuration information of a positioning reference signal of the fourth positioning reference signal group relative to the configuration window; for example, an offset of a starting location of the fourth positioning reference signal relative to the configuration window, or a time offset of the fourth positioning reference signal relative to a starting location of a configuration window calculated according to a window length, or other configuration information described above, such as a signal period and a muting parameter.

When one piece of second activation state information is associated with one or a group of positioning reference signal reporting settings and/or positioning reference signal resource settings, during activation of reporting and/or measurement, a specific positioning reference signal may be selected from one or a group of positioning reference signal reporting settings and/or positioning reference signal resource settings for reporting and/or measurement, that is, a specific positioning reference signal resource set, a positioning reference signal corresponding to a specific frequency layer, or a positioning reference signal corresponding to a specific positioning reference signal resource, or the like is selected from a positioning reference signal reporting setting and/or positioning reference signal resource setting associated with one piece of the second activation state information. A specific positioning reference signal may alternatively be indicated by identification information of one second positioning reference signal group or identification information included in the second activation state list, or may be indicated by higher-layer signaling.

In a possible implementation, the specific positioning reference signal may have the same characteristics as the specific positioning reference signal activated by the activation state configuration information. Details may refer to the above description and are not repeated herein.

In this embodiment, the second activation state information may indicate to activate reporting or measurement and reporting of the positioning reference signals in the second positioning reference signal group. Optionally, the second activation state information may also be used to indicate reporting of measurement information of a fifth positioning reference signal group. The fifth positioning reference signal group may include one of the following:
  (1) a first specific positioning reference signal, where the first specific positioning reference signal is some or all of the positioning reference signals in the second positioning reference signal group. That is, when one piece of activation state information indicates a terminal to measure positioning reference signals in the second positioning reference signal group, the activation state information may also indicate the terminal to report measurement information of some or all of the positioning reference signals therein;
  (2) a second specific positioning reference signal, where the second specific positioning reference signal is some or all of the positioning reference signals in the fourth positioning reference signal group; and
  (3) a union of the first specific positioning reference signal and other positioning reference signals, where the other positioning reference signals are positioning reference signals other than the second positioning reference signal group. For example, the positioning reference signal in the second positioning reference signal group is an aperiodic positioning reference signal, and then other positioning reference signals may be periodic positioning reference signals.

In the foregoing possible implementation, optionally, the measurement information may include at least one of the following:
  reference signal time difference (RSTD);
  reference signal received power (RSRP);
  receive-transmit (RX-TX) time difference;
  receive beam;
  identification information of a positioning reference signal;
  location information; or
  relative location information.

In a possible implementation, the first activation state information and the second activation state information may be the same or different. For example, the first activation state list and the second activation state list may be a same list, and each member is associated with one or more first positioning reference signal groups and one or more second positioning reference signal groups. Optionally, a first positioning reference signal group and a second positioning reference signal group associated with a same member in the activation state list may be the same or different. For example, the second positioning reference signal group associated with the same member may be some or all of the positioning reference signals in the first positioning reference signal group.

In a possible implementation, the first activation state list and/or the second activation state list may include various activation state lists. For example, the first activation state list and/or the second activation state list includes at least one of the following:
  (1) a semi-static activation state list, where a positioning reference signal in the semi-static activation state list is a semi-static positioning reference signal. That is, in the semi-static activation state list, a positioning reference signal associated with the activation state information (including the first activation state information and/or the second activation state information) is a semi-static positioning reference signal;
  (2) an aperiodic activation state list, where a positioning reference signal in the aperiodic activation state list is an aperiodic positioning reference signal. That is, in the aperiodic activation state list, a positioning reference signal associated with the activation state information (including the first activation state information and/or the second activation state information) is an aperiodic positioning reference signal; or
  (3) an on-demand activation state list, where a first positioning reference signal in the on-demand activation state list is an on-demand positioning reference signal. That is, in the on-demand activation state list, a positioning reference signal associated with the activation state information (including the first activation state information and/or the second activation state information) is an on-demand positioning reference signal. The on-demand positioning reference signal may be a semi-static positioning reference signal or an aperiodic positioning reference signal.

It should be noted that functions of the different activation state lists may be the same or different. For example, the activation state information in the aperiodic activation state list may be used to activate transmission and measurement result reporting of the positioning reference signal. However, the activation state information in the semi-static activation state list might only be used to activate transmission or measurement result reporting of the positioning reference signal. Any combination of the above statements may also exist. Details are not described herein.

In the foregoing possible implementation, optionally, the first activation state list and/or the second activation state list may also record: first indication information for indicating that the first activation state list or the second activation state list is used to activate transmission and/or to activate reporting. That is, the first indication information is recorded in each activation state list to indicate whether the activation state list is used to activate transmission or reporting, or both transmission and reporting.

In the foregoing possible implementation, optionally, the first activation state list and/or the second activation state list may also record: second indication information for indicating that the first activation state list or the second activation state list is a semi-static activation state list, an aperiodic activation state list, or an on-demand activation state list.

In a possible implementation, the positioning reference signals in the first positioning reference signal group and/or the positioning reference signals in the second positioning reference signal group satisfy one of the following:
(1) having a same signal time domain type; for example, all positioning reference signals are periodic positioning reference signals, or aperiodic positioning reference signals, or semi-static positioning reference signals;
(2) having a same bandwidth part (BWP) ID; that is, BWP IDs are the same;
(3) having a same frequency layer;
(4) having a same time domain parameter, where the time domain parameter includes at least one of the following: period, slot offset, muting parameter, or number of repetitions;
(5) belonging to a same positioning reference signal resource set (resource set);
(6) belonging to a same active group setting;
(7) having a same group ID (group ID);
(8) having a same resource parameter, where the resource parameter includes at least one of the following: beam, beam group, resource set ID, resource ID, or QCL information;
(9) belonging to one or more first unit resources, where the first unit resource includes one of the following: a positioning reference signal resource, a positioning reference signal resource set, a positioning reference signal resource corresponding to one TRP, and a positioning reference signal resource corresponding to one frequency layer;
(10) having a same reporting type;
(11) having a same reporting configuration;
(12) having a same measurement type;
(13) having a same measurement configuration;
(14) having a same reporting group; and
(15) having a same measurement group.

In a possible implementation in this embodiment of this application, the positioning reference signal resource setting may include one or a group of first unit resources, where the first unit resource may include one of the following: a positioning reference signal resource, a positioning reference signal resource set, a positioning reference signal resource corresponding to one TRP, and a positioning reference signal resource corresponding to one frequency layer (that is, positioning reference signal resources on a frequency layer).

Optionally, positioning reference signals included in one positioning reference signal resource set may satisfy one of the following:
having a same signal time domain type;
having a same BWP ID;
having a same frequency layer;
having a same time domain parameter, where the time domain parameter includes at least one of the following: period, slot offset, muting parameter, or number of repetitions;
belonging to a same active group setting;
having a same group ID;
having a same resource parameter, where the resource parameter includes at least one of the following: beam, beam group, resource set ID, resource ID, or QCL information;
having a same reporting type;
having a same reporting configuration;
having a same measurement type;
having a same measurement configuration;
having same reporting quality;
having a same reporting group; and
having a same measurement group.

Optionally, in one embodiment, the positioning reference signal resource set includes one or more positioning reference signal sets with a same signal time domain type (such as periodic, semi-static, or aperiodic), and optionally, the positioning reference signal sets may come from one or more TRPs.

Optionally, in another embodiment, the positioning reference signal resource set includes one or more TRP sets with a same BWP ID. Besides, an effective combination of any of the above characteristics may exist. Details are not repeated herein.

In a possible implementation, the configuration information of the first positioning reference signal may further include at least one of the following:
ID information of the first positioning reference signal, where the ID information includes at least one of the following: frequency layer indicator information; transmission reception point (TRP) ID information; resource set or resource ID information; TRP group ID information; positioning reference signal group ID information; positioning reference signal resource group ID information; positioning reference signal resource set ID information; positioning reference signal reporting setting ID information; measurement gap (MG) ID information; or bandwidth part (BWP) ID information;
configuration information corresponding to the ID information, where the corresponding configuration information includes at least one of the following: period; muting parameter; number of repetitions; offset within a period; bandwidth information; frequency domain offset information; time information; spatial direction indication information; transmission configuration indicator (TCI) indication information; quasi-co-location (QCL) indication information; beam indication information; power information; MG configuration information; type of positioning reference signal; BWP information; transmission; stop of transmission; activation/deactivation flag; numerology; or time offset information;
positioning method indication information;
precision requirement information;
configuration information of a first configuration window;
discontinuous reception (DRX) configuration information;
positioning reference signal reporting setting ID;
indication information of whether to be multiplexed with another signal;
configuration information of a multiplexed signal; or
priority indication information of the first positioning reference signal.

In a possible implementation, the configuration information of the first configuration window includes at least one of the following:
a first configuration window of a positioning reference signal indicated by the first ID information;
a first configuration window of a selected positioning reference signal;
configuration information of the positioning reference signal indicated by the first ID information in relation to the first configuration window;
configuration information of a selected positioning reference signal in relation to the first configuration window;
configuration information of the first positioning reference signal in relation to the first configuration window;

configuration information of the selected positioning reference signal in relation to the first configuration window;

start time information of the first configuration window;

window length information of the first configuration window; or period information of the first configuration window; where The first configuration window includes at least one of the following: a search window, a measurement window, a measurement gap (MG) window, or a reporting window.

In a possible implementation, a network-side device may configure or reconfigure the positioning reference signals. Therefore, in this possible implementation, the method may further include: receiving, by the terminal, a configuration command carrying first ID information, where the first ID information includes at least one of the following: frequency layer indicator information; transmission reception point (TRP) ID information; resource set or resource ID information; TRP group ID information; first positioning reference signal group ID information; first positioning reference signal resource group ID information; first positioning reference signal resource set ID information; measurement gap (MG) ID information; bandwidth part (BWP) ID information; first activation state information, where, for example, in a case that one piece of the first activation state information is associated with one positioning reference signal resource setting, the first activation state information may be used to indicate a configured positioning reference signal resource setting; or third positioning reference signal group ID information, where, for example, in a case that one third positioning reference signal group is associated with one positioning reference signal resource setting, the third positioning reference signal group ID information may be used to indicate a configured positioning reference signal resource setting.

In the foregoing possible implementation, optionally, the configuration signaling may further carry one or more pieces of configuration information, where the configuration information may include at least one of the following: period; muting parameter; number of repetitions; offset within a period; bandwidth information; frequency domain offset information; time information; spatial direction indication information; TCI indication information; QCL indication information; beam indication information; power information; MG configuration information; type of positioning reference signal; BWP information; transmission; stop of transmission; activation/deactivation flag; numerology; or time offset information (for example, a cell time offset and/or a TRP time offset).

After the terminal receives the configuration command, the method further includes: modifying, by the terminal according to the one or more pieces of configuration information, one or more pieces of configuration information corresponding to all positioning reference signals indicated by or corresponding to the first ID information. For example, the configuration signaling may carry a positioning reference signal resource setting ID and configuration information of any or some or all of the positioning reference signals. For example, the positioning reference signal resource setting ID and the BWP ID may be used for modifying BWP information of all positioning reference signals in the positioning reference signal resource setting corresponding to the ID. For another example, the PRS positioning reference signal resource setting ID and a stop or activation command may be used to stop or activate transmission of all positioning reference signals in the positioning reference signal resource setting corresponding to the ID.

Optionally, the configuration signaling may further carry configuration information of the first configuration window, where the configuration information of the first configuration window is used to indicate at least one of the following:

(1) a first configuration window of a positioning reference signal indicated by the first ID information; that is, indicating to modify the configuration information of a first configuration window of a positioning reference signal indicated by the first ID information into the configuration information of the first configuration window carried in the configuration signaling. In a possible embodiment, the configuration information of the first configuration window includes at least one of a window type, a window length, window starting location information, window time domain offset information, or a window period;

(2) a first configuration window of a selected positioning reference signal, that is, the configuration information indicates a first configuration window of the selected positioning reference signal. Optionally, the selected positioning reference signal may be a positioning reference signal pre-agreed or pre-configured or with a specific characteristic, and the selected positioning reference signal may be one or more positioning reference signals in the positioning reference signal resource setting indicated by the first ID information;

(3) configuration information of the positioning reference signal indicated by the first ID information in relation to the first configuration window. In this possible implementation, the configuration information of the first configuration window carried in the configuration signaling is used to indicate the configuration information of the positioning reference signal indicated by the first ID information in relation to the first configuration window, for example, the positioning reference signal indicated by the first ID information being within the first configuration window, or offset information of the positioning reference signal indicated by the first ID information in relation to the first configuration window, or the like; or (4) configuration information of a selected positioning reference signal in relation to the first configuration window, for example, offset information of the selected positioning reference signal in relation to the first configuration window.

The first configuration window includes at least one of the following: a search window, a measurement window, a measurement gap (MG) window, or a reporting window.

In a possible implementation in this embodiment of this application, one positioning reference signal reporting setting is one or a group of positioning reference signal resource settings.

Optionally, positioning reference signals included in one positioning reference signal reporting setting may satisfy one of the following:

(1) having a same reporting time domain type;
(2) having a same reporting resource type;
(3) having same reporting period and offset;
(4) having a same BWP ID;
(5) having a same frequency layer;
(6) having a same carrier;

(7) having a same time domain parameter, where the time domain parameter includes at least one of the following: period, slot offset, muting parameter, or number of repetitions;
(8) belonging to a same positioning reference signal resource set;
(9) belonging to a same active group setting;
(10) having a same group ID;
(11) having a same resource parameter, where the resource parameter includes at least one of the following: beam, beam group, resource set ID, resource ID, or QCL information;
(12) having a same reporting type;
(13) having a same reporting configuration;
(14) having a same measurement type;
(15) having a same measurement configuration;
(16) having same reporting quality;
(17) having a same reporting group; and
(18) having a same measurement group.

In a possible implementation, the reporting state configuration information includes reporting related information, where the reporting related information includes at least one of the following: reporting resource, reporting type, or reporting content.

Optionally, the reporting state configuration information carries one or more pieces of second ID information, and the second ID information is used to indicate a first positioning reference signal corresponding to the reporting state configuration information. The second ID information may include at least one of the following:
frequency layer indicator information;
transmission reception point (TRP) ID information;
resource set or resource ID information;
TRP group ID information;
first positioning reference signal group ID information;
first positioning reference signal resource group ID information;
first positioning reference signal resource set ID information;
MG ID information;
BWP ID information;
positioning reference signal reporting setting ID information, indicating a configured positioning reference signal reporting setting;
second activation state information, indicating second activation state information associated with a configured positioning reference signal;
second positioning reference signal group ID information, indicating that a configured positioning reference signal group includes a second positioning reference signal group;
fourth positioning reference signal group ID information, indicating that a configured positioning reference signal group includes a fourth positioning reference signal group;
fifth positioning reference signal group ID information, indicating that a configured positioning reference signal group includes a fifth positioning reference signal group;
ID information of a positioning reference signal associated with one piece of the second activation state information, indicating to configure a positioning reference signal corresponding to the ID information; or
ID information of a selected positioning reference signal, indicating to configure a positioning reference signal corresponding to the ID information.

Optionally, the reporting state configuration information may further include: a reporting time window and/or reporting time offset of the reporting resource. The reporting time window and/or reporting time offset of the reporting resource may be used to configure a reporting resource when the first positioning reference signal is reported.

In a possible implementation, the method may further include: receiving a reporting resource configuration command, where the reporting resource configuration command is used to configure reporting state information of the positioning reference signal in the positioning reference signal reporting setting, where the reporting related information includes at least one of the following: reporting resource, reporting type, or reporting content. Optionally, the positioning reference signal reporting setting ID and configuration information may be used to configure the reporting related information of all or specified positioning reference signals in the positioning reference signal reporting setting.

In another possible implementation, the method may further include: receiving a reporting resource configuration command, where the reporting resource configuration command is used to configure reporting state information of a third target positioning reference signal, where the reporting related information includes at least one of the following: reporting resource, reporting type, or reporting content; and the third target positioning reference signal includes one of the following: a positioning reference signal associated with one of the second activation states, the second positioning reference signal group, and a selected positioning reference signal. In this possible implementation, a reporting resource configuration command may be used to configure or reconfigure the reporting related information of the third target positioning reference signal.

Optionally, in the foregoing possible implementation, the reporting resource configuration command carries third ID information, where the third ID information includes at least one of the following:
(1) first ID information described above;
(2) positioning reference signal reporting setting ID information. The ID information may be used to indicate that the reporting resource configuration command is used to configure or reconfigure the reporting related information of the positioning reference signal corresponding to a positioning reference signal reporting setting indicated by the ID information;
(3) second activation state information. The second activation state information may be used to indicate that the reporting resource configuration command is used to configure or reconfigure reporting related information of a positioning reference signal associated with the second activation state information;
(4) second positioning reference signal group ID information, that is, the reporting resource configuration command is used to configure or reconfigure reporting related information of a positioning reference signal in the second positioning reference signal group;
(5) fourth positioning reference signal group ID information; that is, the reporting resource configuration command is used to configure or reconfigure reporting related information of a positioning reference signal in the fourth positioning reference signal group, where, as described above, the fourth positioning reference signal group is a subset of the second positioning reference signal group;
(6) fifth positioning reference signal group ID information; that is, the reporting resource configuration command is used to configure or reconfigure reporting related information of a positioning reference signal in the fifth positioning reference signal group, where, as described above, the fifth positioning reference signal group is a subset of the second positioning reference signal group;

(7) ID information of a positioning reference signal associated with one piece of the second activation state information, that is, the reporting resource configuration command is used to configure or reconfigure reporting related information of a positioning reference signal associated with one piece of the second activation state information; or (8) ID information of a selected positioning reference signal, that is, the reporting resource configuration command is used to configure or reconfigure reporting related information of a positioning reference signal corresponding to the ID information.

Optionally, in the foregoing possible implementation, the reporting resource configuration command may further include a reporting time window and/or reporting time offset of the reporting resource. With the reporting time window and/or reporting time offset, the terminal may determine time domain information in the reporting resource.

In a possible implementation in this embodiment of this application, the first time domain offset information may include at least one of the following (1) to (5).

(1) Time domain offset information between activation signaling for first positioning reference signals and a first specified positioning resource, where the first specified positioning resource includes one of the following: the 1st second unit resource of a predetermined first positioning reference signal, any second unit resource of the predetermined first positioning reference signal, and each second unit resource of the predetermined first positioning reference signal, where the predetermined first positioning reference signal includes one of the following: one or a group of positioning reference signals specified in advanced in the first positioning reference signals, one or a group of positioning reference signals determined from the first positioning reference signals according to a fixed rule, and one or a group of positioning reference signals determined from the first positioning reference signals according to protocol prescription; and the second unit resource includes one of the following: a positioning reference signal resource, a positioning reference signal resource set, a frequency layer, a positioning reference signal resource setting, a positioning reference signal resource corresponding to one TRP, and a positioning reference signal resource corresponding to an activation state list. In this possible implementation, the first time domain offset information may be configured per second unit resource, for example, per PRS resource (resource)/per PRS resource set (resource set)/per PRS resource setting (resource setting)/per TRP/per frequency layer/per trigger list. The predetermined first positioning reference signal may be one or a group of positioning reference signals specified in advance, for example, one or a group of positioning reference signals corresponding to a specified positioning reference signal resource or positioning reference signal resource set, or may be one or a group of positioning reference signals prescribed by a protocol, or may be one or a group of positioning reference signals determined from the first positioning reference signals according to a fixed rule, which is not specifically limited in this embodiment.

In this possible implementation, optionally, in a case that the predetermined first positioning reference signal is a group of positioning reference signals and that the first specified positioning resource is the 1st second unit resource of the predetermined first positioning reference signal, the first time domain offset information may further include: time domain offset information of other second unit resources in the predetermined first positioning reference signal relative to the 1st second unit resource. In this possible implementation, time domain offset information of other second unit resources in the predetermined first positioning reference signal relative to the 1st second unit resource is configured, so that the terminal may obtain time domain offset information of each of the second unit resources of the predetermined first positioning reference signal relative to the activation signaling for first positioning reference signals.

In another possible implementation, if the predetermined first positioning reference signal is a group of positioning reference signals and the first specified positioning resource is any second unit resource of the predetermined first positioning reference signal, the first time domain offset information may further include: time domain offset information of other second unit resources in the predetermined first positioning reference signal relative to the any second unit resource. In this possible implementation, time domain offset information of other second unit resources in the predetermined first positioning reference signal relative to the any second unit resource is configured, so that the terminal may obtain time domain offset information of each of the second unit resources of the predetermined first positioning reference signal relative to the activation signaling for first positioning reference signals.

(2) Time domain offset information between activation signaling for first positioning reference signals and a second specified positioning resource, where the second specified positioning resource is one of the following: any second unit resource of the first positioning reference signals and the 1st second unit resource of any positioning reference signal group, where the positioning reference signal group includes one or more of the first positioning reference signals.

In this possible implementation, optionally, in a case that the second specified positioning resource is the 1st second unit resource of any positioning reference signal group, the first time domain offset information may further includes: time domain offset information of other second unit resources in the any positioning reference signal group relative to the 1st second unit resource.

In this possible implementation, other positioning reference signals each have a slot offset relative to the 1st positioning reference signal (which may be first positioning reference signals activated simultaneously, or may be a first positioning reference signal resource/positioning reference signal resource set/positioning reference signal resource setting/TRP/frequency layer/per trigger list) in the positioning reference signal group. For example, in a case that the first time domain offset information is configured per resource set (that is, the second unit resource is a positioning reference signal resource set), the first time domain offset information also includes a slot offset of each resource in the resource set relative to the resource set. For another example, in a case that the first time domain offset information is configured per resource setting (that is, the second unit resource is a positioning reference signal resource setting), the first time domain offset information also includes a slot offset of each positioning reference signal resource or positioning reference signal resource set relative to the resource setting.

Or, in a case that the second specified positioning resource is any second unit resource of any positioning reference signal group, the first time domain offset information may further include: time domain offset information of other second unit resources in the any positioning reference signal group relative to the any second unit resource.

(3) Time domain offset information between activation signaling for first positioning reference signals and a third specified positioning resource, where the third specified positioning resource includes one of the following: all second unit resources of any first positioning reference signals and all second unit resources of any positioning reference signal group. That is, the first time domain offset information is configured per resource/PRS resource set/PRS resource setting/TRP/per trigger list, and the first time domain offset information includes time domain offset of the activation signaling for first positioning reference signals relative to any second unit resource or each second unit resource of any group.

(4) Time domain offset information between activation signaling for first positioning reference signals and a fourth specified positioning resource, where the fourth specified positioning resource includes one of the following: all second unit resources of one first positioning reference signal in a serving cell or reference TRP, the 1st second unit resource of one first positioning reference signal in a serving cell or reference TRP, any second unit resource of one first positioning reference signal in a serving cell or reference TRP, all second unit resources of any positioning reference signal group in a serving cell or reference TRP, the 1st second unit resource of any positioning reference signal group in a serving cell or reference TRP, and any second unit resource of any positioning reference signal group in a serving cell or reference TRP.

In this possible implementation, the first time domain offset information may further include: offset information of other cells or other TRPs relative to the serving cell or reference TRP, where the offset information includes: time domain offset information and/or a system frame number (SFN) offset.

(5) Time domain offset information between activation signaling for first positioning reference signals and a second configuration window, where the second configuration window is a subset of a first configuration window, and the first configuration window is a configuration window indicated in the configuration information of the first positioning reference signaling. The second configuration window being a subset of the first configuration window can be understood as that the second configuration window is one of the first configuration windows, or can be understood as that the second configuration window is associated with the first configuration window or inherits some characteristics of the first configuration window.

In a possible embodiment, the activation signaling for first positioning reference signals activates the second configuration window, and the time domain offset information between the activation signaling for first positioning reference signals and the second configuration window may be configuration information of the first configuration window and may also be carried in the activation information. The activation signaling for first positioning reference signals activates the second configuration window and can be understood as activating the positioning reference signals in the second configuration window. Configuration information of the second configuration window is similar to the configuration information of the first configuration window, and the positioning reference signal in the second configuration window may be configured in the same manner as the positioning reference signal in the first configuration window.

In this possible implementation, window length information of the first configuration window may further be configured. In this possible implementation, during configuration, the network-side device may determine that the positioning reference signal to be measured is within the first configuration window.

It should be noted that the first time domain offset may be configured through one piece of configuration information, or may be configured through a plurality of pieces of configuration information, or is configured jointly through the activation information and the configuration information. In a possible embodiment, the configuration information includes time domain offsets between the predetermined first positioning reference signal and other first positioning reference signals, and the activation information includes a time domain offset between the activation signaling and the predetermined first positioning reference signal. In another possible embodiment, the configuration information includes a time domain offset between the first positioning reference signal and the first configuration window, and the activation information includes time domain offsets between the activation signaling and the first configuration window. The foregoing other solutions may also have a similar implementation process, which is not repeated herein.

In each of the foregoing possible implementations, the activation signaling for first positioning reference signals may activate signaling for the first positioning reference signal, such as DCI, or may be feedback information (for example, HARQ) for a physical downlink shared channel (for example, including MAC CE, RRC signaling, and LPP signaling with activation information of the positioning reference signal).

In a possible implementation, the second time domain offset information is time domain offset information for activating reporting. The second time domain offset information may include at least one of the following (1) to (3).

(1) Time domain offset information between an activation command transmitted for activating first positioning reference signals and a target positioning reference signal report, where the target positioning reference signal report is a positioning reference signal report of one or more positioning reference signals in the first positioning reference signals.

For example, the second time domain offset information is time domain offset information between the activation signaling (such as DCI, or feedback information HARQ of PDSCH (MAC CE, RRC, and LPP)) and a PRS report (Report), that is, time domain offset information between the activation signaling and reporting resource (for example, PUCCH or PUSCH) of the PRS report, such as a slot offset, where optionally, the slot offset may be 0, . . . , or 32.

In this possible implementation, the target positioning reference signal report is a positioning reference signal report of some or all of the first positioning reference signals.

(2) Time domain offset information between a time at which first positioning reference signals are activated and the target positioning reference signal report.

Optionally, the time at which the first positioning reference signal is activated may include at least one of the following:
  i. an operation result of a predetermined function with the first time domain offset information between an activation time of the first positioning reference signal and the first positioning reference signals as a parameter. For example, the activation time of the first positioning reference signal plus the first time domain offset information is the activation time of the first positioning reference signal. Certainly, it is not limited thereto. In practice, it may alternatively be another operation result with the first time domain offset information between the activation time of the first positioning reference signal and the first positioning reference signals as a parameter, for example, a sum function of the activation time of the first positioning reference signal and first time domain offset information corresponding to the numerology of the first positioning reference signal for receiving an activation command, or for another example, a sum function of the activation time of the first positioning reference signal and the first time domain offset information corresponding to the numerology of the first positioning reference signal for transmitting reporting information. As described above, the activation time of the first positioning reference signal is a time at which DCI of the first positioning reference signal is activated or a transmitting time of feedback information HARQ of a PDSCH;

ii. a transmitting time of the 1st first positioning reference signal that has been activated; or iii. a transmitting time of the last first positioning reference signal that has been activated.

(3) Time domain offset information between an activation command reported for activating first positioning reference signals and the target positioning reference signal report.

In a possible implementation, the second time domain offset information includes at least one of the following (1) to (3).

(1) Time domain offset information of a positioning reference signal report relative to a fifth specified positioning resource, where the fifth specified positioning resource includes one of the following: all third unit resources of one first positioning reference signal, the 1st third unit resource of one first positioning reference signal, any third unit resource of one first positioning reference signal, all third unit resources of one positioning reference signal group, the 1st third unit resource of one positioning reference signal group, and any third unit resource of one positioning reference signal group, where the third unit resource includes one of the following: a positioning reference signal resource, a positioning reference signal resource set, a positioning reference signal resource setting, a positioning reference signal reporting setting, a positioning reference signal resource corresponding to one TRP, a positioning reference signal resource corresponding to one frequency layer, and a positioning reference signal resource corresponding to one activation state information list.

That is, in this possible implementation, the second time domain offset information is configured per third unit resource, where the third unit resource being a positioning reference signal resource corresponding to one TRP means that the second target offset information is configured in unit of TRP, that is, the positioning reference signal corresponding to each TRP is configured with one piece of second time domain offset information; the third unit resource being a positioning reference signal resource corresponding to one frequency layer means that the second target offset information is configured in unit of frequency layer, that is, the positioning reference signal corresponding to each frequency layer is configured with one piece of second time domain offset information; and the third unit resource being a positioning reference signal resource corresponding to one activation state information entry means that the second target offset information is configured in unit of one activation state information entry, that is, the positioning reference signal corresponding to each one activation state information entry is configured with one piece of second time domain offset information.

In practical applications, the positioning reference signal activated by the activation information for reporting may include a plurality of first positioning reference signals, and different first positioning reference signals in the plurality of first positioning reference signals may be configured with different second time domain offsets, so that the terminal selects one piece of the second time domain offset information according to a first rule to perform reporting of a positioning reference signal report.

Optionally, the first rule includes but is not limited to at least one of the following:

(a) selecting second time domain offset information indicated in a downlink command received, for example, second time domain offset information indicated in DCI or a MAC CE;

(b) selecting second time domain offset information with a largest offset value in a plurality of pieces of the second time domain offset information; and (c) selecting second time domain offset information with a largest offset value in a plurality of pieces of second time domain offset information indicated in a downlink command received.

(2) Time domain offset information of a positioning reference signal report relative to a sixth specified positioning resource, where the sixth specified positioning resource includes one of the following: any third unit resource of one first positioning reference signal in a serving cell or reference TRP, all second unit resources of one first positioning reference signal in a serving cell or reference TRP, the 1st third unit resources of one first positioning reference signal in a serving cell or reference TRP, all third unit resources of one positioning reference signal group in a serving cell or reference TRP, the 1st third unit resource of one positioning reference signal group in a serving cell or reference TRP, and any third unit resource of one positioning reference signal group in a serving cell or reference TRP, where the target positioning reference signal report is a positioning reference signal report of one or more positioning reference signals in the first positioning reference signals.

For example, the second time domain offset information is time domain offset information between all or a first or any PRS resource/PRS resource set/PRS resource setting/TRP/frequency layer and a PRS Report (a reporting resource of PUCCH or PUSCH) in one PRS or a PRS group of a serving cell/reference TRP.

(3) Time domain offset information of a target positioning reference signal report relative to a starting point or an ending point of a third configuration window, where the third configuration window is a subset of a first configuration window, and the first configuration window is a configuration window indicated in the configuration information of the first positioning reference signaling. The third configuration window being a subset of the first configuration window can be understood as that the third configuration window is one of the first configuration windows, or can be understood as that the third configuration window is associated with the first configuration window or inherits some characteristics of the first configuration window.

In a possible implementation, an absolute time of the target positioning reference signal report is provided.

In a possible implementation, the first time domain offset information and/or the second time domain offset information may satisfy at least one of the following (1) to (6).

(1) Corresponding to a different offset value in a different numerology (numerology).

For example, when the numerology of activated PRSs is the same, a transmitting time of the PRS may be a first case, and when numerology of the activated PRSs is different, a transmitting time of the PRS may be a second case.

The numerology corresponding to the time domain offset may be specified in the configuration information, or may be the same as the PRS configuration information, or may be the same as an active BWP in which the DCI is located, or may be the same as a UL active BWP reported.

In the first case, the transmitting time of an aperiodic PRS=slot n+X, and the transmitting time of a periodic or semi-static or periodic on-demand PRS=slot n+X+P, where slot n is the transmitting or receiving time of the activation signaling of the PRS, and X is the first time domain offset information of the PRS, that is, a time domain offset of the PRS transmission relative to the activation signaling, and the time domain offset information may be configured in the PRS configuration information, for example, configured per positioning reference signal resource or positioning reference signal resource set or TRP or positioning reference signal group, and details may refer to the above description about the first time domain offset information. Alternatively, the time domain offset information may be provided in a MAC CE or DCI, and P is a PRS period.

In the second case, (numerology), cross-carrier scheduling, and the like are considered in determining of a transmitting time of an aperiodic PRS. The transmitting time of the aperiodic PRS is:

$$\left\lfloor n \cdot \frac{2^{\mu_{PRS}}}{2^{\mu_{PDCCH}}} \right\rfloor + X + \left\lfloor \left( \frac{N^{CA}_{slot,offset,PDCCH}}{2^{\mu_{offset,PDCCH}}} - \frac{N^{CA}_{slot,offset,PRS}}{2^{\mu_{offset,PRS}}} \right) \cdot 2^{\mu_{PRS}} \right\rfloor,$$

If a PRS is a periodic, semi-static, or periodic on-demand PRS, the transmitting time of the PRS is:

$$\left\lfloor n \frac{2^{\mu_{PRS}}}{2^{\mu_{PDCCH}}} \right\rfloor + X + P + \left\lfloor \left( \frac{N^{CA}_{slot,offset,PDCCH}}{2^{\mu_{offset,PDCCH}}} - \frac{N^{CA}_{slot,offset,PRS}}{2^{\mu_{offset,PRS}}} \right) \cdot 2^{\mu_{PRS}} \right\rfloor$$

where n is an activation time of the PRS, P is a PRS period, $\mu_{PRS}$ is a numerology of the PRS, $\mu_{PDCCH}$ is a numerology of a PDCCH, $N^{CA}_{slot,offset,PDCCH}$ is a slot offset of a PDCCH on a carrier, $\mu_{offset,PDCCH}$ is a numerology offset of the PDCCH on a different carrier, $N^{CA}_{slot,offset,PRS}$ is a slot offset of the PRS on the carrier, and $\mu_{offset,PRS}$ is a numerology offset of the PRS on a different carrier.

(2) Being not less than a minimum scheduling offset to ensure that transmitting or reporting of the positioning reference signal is not earlier than the activation time of the positioning reference signal.

(3) Being not less than a beam switching time. In a case that it is less than the beam switching time, UE does not expect to use the configured QCL to receive the PRS or report the measurement information; and optionally, the UE uses the default QCL or beam or the QCL or beam associated with a CORESET with the lowest ID to receive the PRS or report the measurement information.

(4) Being not less than a transmitting time of a downlink command and/or a processing time of a first positioning reference signal.

(5) An indicated reporting time of a positioning reference signal report being not earlier than an activation time of a first positioning reference signal.

(6) An offset value indicated by the second time domain offset information being greater than an offset value indicated by the first time domain offset information, that is, reporting of the target positioning reference signal report being later than transmission of the positioning reference signal.

Optionally, an offset value indicated by the first time domain offset information is 0 in at least one of the following cases:
(1) a first positioning reference signal activated is configured with no QCL information;
(2) a minimum scheduling offset is 0;
(3) a time domain offset of a first positioning reference signal activated relative to activation information of the first positioning reference signal is 0;
(4) a third time domain offset of a first positioning reference signal activated relative to activation information of the first positioning reference signal is 0; or
(5) a first time domain offset of a first positioning reference signal activated relative to a first positioning reference signal referenced is 0.

The third time domain offset is a time domain offset included in the activation information.

In this embodiment of this application, the determining factors of the second time domain offset information include: a processing time of the first positioning reference signal by the terminal, and/or, the number and/or configuration information of the first positioning reference signals.

In this application, the configuration information of beam switching or quasi-co-location (QCL) switching includes: a threshold time of beam switching or a threshold time of QCL switching, and the terminal may determine based on the threshold time whether QCL specified by a network side may be used for measurement.

In a possible implementation in this embodiment of this application, in addition to the activation state configuration information, reporting state configuration information, the first time domain offset information, the second time domain offset information, and the configuration information of beam switching or QCL switching that are described above, the configuration information of the first positioning reference signal may include at least one of the following:

(1) ID information of the first positioning reference signal, where the ID information includes at least one of the following: frequency layer indicator information; TRP ID information; resource set or resource ID information; TRP group ID information; positioning reference signal group ID information; positioning reference signal resource group ID information; positioning reference signal resource set ID information; positioning reference signal reporting setting ID information; MG ID information; or BWP ID information;

(2) configuration information corresponding to the ID information, where the corresponding configuration information includes at least one of the following: period; muting parameter; number of repetitions; offset within a period; bandwidth information; frequency domain offset information; time information; spatial direction indication information; transmission configuration indicator (TCI) indication information; QCL indication information; beam indication information;

power information; MG configuration information; type of positioning reference signal; BWP information; transmission; stop of transmission; activation/deactivation flag; numerology (numerology); or time offset information, where types of positioning reference signals include at least one of the following: periodic positioning reference signal, aperiodic positioning reference signal, semi-static positioning reference signal, or on-demand positioning reference signal (which may be aperiodic or semi-static). If the ID information includes a TRP ID, the time offset information includes TRP time offset information corresponding to the TRP ID, or the time offset information may alternatively include cell time offset information;

(3) positioning method indication information;
(4) precision requirement information;
(5) a first configuration window; optionally, the first configuration window may include at least one of the following: configuration information of the first positioning reference signal in relation to the first configuration window; configuration information of a selected positioning reference signal in relation to the first configuration window; start time information of the first configuration window; window length information of the first configuration window; period information of the first configuration window; a pattern (pattern) of the first configuration window, where the first configuration window includes at least one of the following: a search window, a measurement window, a measurement gap (MG) window, and a reporting window;
(6) discontinuous reception (DRX) configuration information;
(7) power information, for example, a transmit power, a path loss signal, and TPC power adjustment information;
(8) positioning reference signal reporting setting ID;
(9) indication information of whether to be multiplexed with another signal;
(10) configuration information of a multiplexed signal; or
(11) priority indication information of the first positioning reference signal.

In a possible implementation in this embodiment of this application, in addition to the activation state configuration information, reporting state configuration information, the first time domain offset information, the second time domain offset information, and the configuration information of beam switching or QCL switching that are described above, the configuration information of the first positioning reference signal may include at least one of the following:

(1) power control information of the positioning reference signal, which may include path loss signal information;
(2) the BWP switching information, which may include: BWP indication information and BWP request information dedicated to positioning (positioning). Optionally, the UE may indicate a bandwidth required for transmission, and the network side modifies the BWP configuration according to requirements of the UE, and activates BWP switching; and optionally, the BWP configuration may be modified through DCI or a MAC CE;
(3) collision indication information, which may include: priority indication information; or
(4) multiplexing information, where the multiplexing information may include: a type of a multiplexed signal, indication information, and identification information, and the multiplexing information may be included in DCI, a MAC CE, RRC, or LPP.

In a possible implementation in this embodiment, the first target positioning reference signal and/or the second target positioning reference signal may include one of the following: an aperiodic positioning reference signal, a semi-static positioning reference signal, and an on-demand positioning reference signal.

Optionally, the first target positioning reference signal includes one or more sixth positioning reference signal groups, and the sixth positioning reference signal group includes at least one of the first positioning reference signals; and the second target positioning reference signal includes one or more seventh positioning reference signal groups, and the seventh positioning reference signal group includes at least one of the first positioning reference signals. That is, the first target positioning reference signal activated for transmission and the second target positioning reference signal activated for reporting may be a subset of the configured first positioning reference signal.

In addition, the second target positioning reference signal may be a subset of the first target positioning reference signal, that is, the terminal may report some or all of the first target positioning reference signals transmitted by the network side.

Optionally, the sixth positioning reference signal group is associated with one piece of the first activation state information, where the sixth positioning reference signal group is a subset of the first positioning reference signal group, or the sixth positioning reference signal group is a subset of the third positioning reference signal group. For example, during configuration, one piece of the first activation state information may be associated with one first positioning reference signal group and one third positioning reference signal group (for details, refer to the foregoing related descriptions in the configuration information), and when transmission is being activated, some or all of the positioning reference signals in the first positioning reference signal group or the third positioning reference signal group associated with the first activation state information may be activated.

Optionally, the seventh positioning reference signal group is associated with one piece of the second activation state information, where the seventh positioning reference signal group is a subset of the second positioning reference signal group, or the seventh positioning reference signal group is a subset of the fourth positioning reference signal group. For example, during configuration, one piece of the second activation state information may be associated with one second positioning reference signal group and one fourth positioning reference signal group (for details, refer to the foregoing related descriptions in the configuration information), and when transmission is being activated, some or all of the positioning reference signals in the second positioning reference signal group or the fourth positioning reference signal group associated with the second activation state information may be activated.

In a possible implementation, the first positioning reference signals in the sixth positioning reference signal group satisfy at least one of the following:

(1) having a same reporting time domain type; for example, all first positioning reference signals being periodic positioning reference signals, or aperiodic positioning reference signals, or semi-static positioning reference signals;
(2) having a same reporting resource type; for example, all first positioning reference signals being physical uplink control channel (PUCCH) or physical uplink shared channel PUSCH;

(3) having same reporting period and offset, that is, a positioning reference signal reporting period being the same as a reporting time offset;
(4) having a same BWP ID, that is, being on BWPs corresponding to the same BWP ID (ID);
(5) having a same frequency layer;
(6) having a same carrier;
(7) having a same time domain parameter, where the time domain parameter includes at least one of the following: period, slot offset, muting parameter (muting), and number of repetitions (repetition);
(8) belonging to a same reference signal resource set;
(9) belonging to a same active group setting;
(10) having a same group ID;
(11) having a same resource parameter, where the resource parameter includes at least one of the following: beam, beam group, resource set ID, resource ID, and QCL information;
(12) having a same reporting type;
(13) having a same reporting configuration;
(14) having a same measurement type;
(15) having a same measurement configuration;
(16) having same reporting quality;
(17) having a same reporting group; or
(18) having a same measurement group.

In this embodiment of this application, information in the activation information for activating transmission of the first target positioning reference signal may be referred to as a positioning reference signal activation request information, such as PRS-request information.

In a possible implementation, the activation information is included in one of the following: first downlink control information (DCI), a first medium access control control element (MAC CE), first radio resource control (RRC) signaling, and first LTE positioning protocol (LPP) signaling. The activation information includes the above positioning reference signal activation request information for activating transmission of the first target positioning reference signal.

Optionally, the first DCI includes but is not limited to one of the following:
(1) DCI for activation of transmission on a first BWP;
(2) DCI of a predetermined type, where the DCI of the predetermined type may include a PRS-request; and
(3) DCI scrambled by a predetermined radio network temporary ID (RNTI). The predetermined RNTI may indicate a type of the activated first target positioning reference signal, or indicate an activation state list corresponding to the positioning reference signal activation request information, or indicate a corresponding terminal capable of parsing the positioning reference signal activation request information.

For example, A-PRS-RNTI, MG-RNTI, SP-PRS-RNTI, and on-demand-PRS-RNTI may be for distinguishing which positioning reference signal is to be activated or indicate which trigger state list the 'PRS-request' field corresponds to, such as a semi-static trigger state list or an aperiodic trigger state list.

Scrambling using an RNTI related to a trigger state/group/DCI transmission resource may make the first DCI be parsed by more than one terminal, and terminals that need the corresponding first target positioning reference signal may all know that the first target positioning reference signal has been activated for transmission.

In a possible implementation, the positioning reference signal activation request information and/or the first DCI includes at least one of the following:

(1) a first bit string, where every n bits in the first bit string correspond to different first activation state information, a value of the n bits is for activating the first target positioning reference signal for the corresponding first activation state information, and the first bit string is k times n in length, n and k being integers greater than 0. For example, the first bit string includes N bits, every n bits represent activation of a corresponding PRS, and N=k*n. Optionally, the first activation state information corresponding to the value of the n bits may have a plurality of first positioning reference signals, and the first target positioning reference signal may be a specific one of the positioning reference signals, or a positioning reference signal in the plurality of first positioning reference signals that has a correspondence with a positioning reference signal filtered out according to a filtering indication in a MAC CE, or, a positioning reference signal in the plurality of first positioning reference signals that has a correspondence with a positioning reference signal configured by RRC or LPP;
(2) first indication information, where the first indication information indicates that the first DCI is for activating the first target positioning reference signal, or the first indication information indicates that the first DCI is for deactivating the first target positioning reference signal, that is, the first indication information is used to indicate whether the first DCI is for activating or deactivating transmission of the first target positioning reference signal;
(3) a second bit string used to indicate activating a target MG; where for example, the second bit string includes N1 bits;
(4) a third bit string used to indicate activating or switching to a target BWP, where, for example, the third bit string includes N2 bits and indicates a BWP to be activated or a BWP to be switched to;
(5) a fourth bit string used to indicate first target time domain offset information of the first target positioning reference signal, where the first target time domain offset information is an offset relative to the first time domain offset information of the first target positioning reference signal or is a subset of the first time domain offset information of the first target positioning reference signal. For example, in a case that the first target positioning reference signal activated by the second DCI includes a plurality of positioning reference signals, different positioning reference signals in the plurality of positioning reference signals are configured with different first time domain offset information, and the fourth bit string may indicate that the first target time domain offset information is one or more pieces of first time domain offset information in a plurality of pieces of first time domain offset information, for example, indicating that the first target time domain offset information is first time domain offset information with a largest offset value in the plurality of first time domain offset information;
(6) a fifth bit string used to indicate a positioning reference signal corresponding to the first target time domain offset information; or
(7) a sixth bit string used to activate or switch to a first target configuration window, where the first target configuration window is associated with a first configuration window.

In a possible implementation, in S212, that the terminal performs a positioning operation based on the first information may include: receiving and measuring, by the terminal based on the first information, the first target positioning reference signal activated by the positioning reference signal activation request information.

Optionally, before receiving and measuring the first target positioning reference signal activated by the positioning reference signal activation request information, the method further includes: in a case that the first BWP for transmitting the first DCI is different from a target BWP for transmitting the first target positioning reference signal and that the first BWP is active, performing one of the following:
  receiving indication information for switching to the target BWP;
  receiving indication information for activating the target BWP;
  receiving configuration information of a target MG;
  switching to a state of simultaneously supporting two active BWPs;
  switching to a first target configuration window; and
  activating the target BWP.

In a possible implementation, the receiving and measuring the first target positioning reference signal activated by the positioning reference signal activation request information may include: in a case that the first target positioning reference signal activated comes from a neighboring cell of the terminal and that the first time domain offset information of the first target positioning reference signal is configured in relation to an activation command transmitted by a serving cell, performing at least one of the following actions:
  determining a receiving time and/or transmitting time of the first target positioning reference signal in the neighboring cell;
  determining a receiving time and/or transmitting time of the first target positioning reference signal in the serving cell;
  determining an association relationship between a generation sequence of the first target positioning reference signal and a receiving time and/or transmitting time of the first target positioning reference signal in the neighboring cell; or
  determining an association relationship between a generation sequence of the first target positioning reference signal and a receiving time and/or transmitting time of the first target positioning reference signal in the serving cell.

For example, the first target positioning reference signal activated comes from a neighboring cell of the terminal, and the neighboring cell is not synchronized with a serving cell. Then, when the first target positioning reference signal is received and measured, in a case that the first time domain offset information of the first target positioning reference signal is configured in relation to an activation command transmitted by the serving cell, at least one of the above actions may enable the terminal to generate a corresponding sequence for test and measurement.

In a possible implementation, the receiving and measuring the first target positioning reference signal activated by the positioning reference signal activation request information may include: in a case that the first target positioning reference signal activated comes from a neighboring cell of the terminal and that the first time domain offset information of the first target positioning reference signal is offset information relative to the neighboring cell, performing at least one of the following actions:
  determining a receiving time and/or transmitting time of the first target positioning reference signal in the neighboring cell;
  determining a receiving time and/or transmitting time of the first target positioning reference signal in the serving cell;
  determining an association relationship between a generation sequence of the first target positioning reference signal and a receiving time and/or transmitting time of the first target positioning reference signal in the neighboring cell; or
  determining an association relationship between a generation sequence of the first target positioning reference signal and a receiving time and/or transmitting time of the first target positioning reference signal in the serving cell.

In an application, the positioning reference signal activated may come from a serving cell or a neighboring cell. When there is a first target positioning reference signal from a neighboring cell (TRP) and the TRP is not synchronized with the serving cell, then:
  1. The configuration information in the first information also includes time offset information s1 between the TPR and the serving cell, the reference cell, or one of the serving cell and the reference cell, such as SFN0, absolute time or slot offset (slot offset) 3; and
  2. The activation information in the first information also includes real-time cell time offset information s2, where the cell time offset information s2 may be an absolute value, or a difference information with the time offset information s1.

The network-side device may configure the information in the above 1 and 2 to the terminal via LPP/RRC/a broadcast message, or update the information to the terminal via a MAC CE.

Optionally, there are following two possibilities during receiving and measuring of the first time domain offset of the first target positioning reference signal transmitted by the neighboring cell:
  (1) The first time domain offset configured for the first target positioning reference signal is a time N in relation to an activation command (DCI or HARQ carried for MAC CE, RRC, or LPP) from the serving cell,
    then, for the neighboring cell, a time at which a resource for generating or transmitting the first target positioning reference signal of the neighboring cell is: Function (N, time offset information s1, time offset information s2, slot offset).

For example, when the time offset information s1 is a time offset between the TRP and the serving cell from which the activation command is transmitted, the time offset information s2 is a dynamic difference value of the time offset between the TRP and the serving cell from which the activation command is transmitted relative to the time offset information s1, and a transmitting time of the PRS of the neighboring cell is equal to N+s1+s2+slot offset.

In a case that there is a non-integer slot part in the time offset information, optionally, the transmitting time may be rounded up or down at the slot or symbol (symbol) level.

In a case that a calculated transmitting time is rounded up or down, the UE expects that a configured measurement window takes the offset information into account;

(2) The first time domain offset configured by the first target positioning reference signal is a time N in relation to the neighboring cell,
    then, for the serving cell, a time at which a resource for generating or transmitting a PRS of the neighboring cell is: Function (N, time offset information s1, time offset information s2, slot offset).

For example, a receiving time or configuration time expected by the UE to receive the PRS of the neighboring cell is time of n+slot offset for the serving cell, and then an actual transmitting time of the PRS of the neighboring cell is: N+s1+s2+slot offset.

In the foregoing possible implementation, if rounding up or down at symbol or slot level is not performed for the signals, it is also required that no transmission of other data or signals is performed on an extended symbol (because transmission starts at a boundary location).

In the foregoing possible implementation, optionally, a sequence of the PRS of the neighboring cell may include one of the following:
(1) being generated according to a slot/symbol sequence number from the serving cell from which the activation command is transmitted; and
(2) being generated according to a slot/symbol sequence number transmitted from the neighboring cell.

In a case of being generated according to a slot/symbol sequence number transmitted from the neighboring cell, the serving cell or LMF needs to notify the neighboring cell of at least one of the following information:
(1) activation time: absolute time/activation time for the neighboring cell/activation time for the serving cell;
(2) time offset information s1 between the serving cell/reference cell and the neighboring cell; or
(3) serving cell identification information.

Optionally, in a case of being generated according to a slot/symbol sequence of the neighboring cell, when generating a local sequence, UE determines a slot/symbol of the neighboring cell according to the receiving time of the first target positioning reference signal.

In a possible implementation, one or more pieces of downlink signaling may be used to activate a plurality of target objects, where the downlink signaling includes: the first DCI or the first MAC CE, and the target objects include: the first target positioning reference signal, a target BWP, a target MG, and a first target configuration window.

Optionally, different pieces of downlink signaling may be used to activate or deactivate different types of first target positioning reference signals. For example, different first DCIs are used to activate different types of first target positioning reference signals, or first DCI used to activate a same type of first target positioning reference signals is different from first DCI used to deactivate the same type of first target positioning reference signals. Different types of first target positioning reference signals include: periodic positioning reference signal, semi-static positioning reference signal, aperiodic positioning reference signal, or on-demand positioning reference signal.

Or, optionally, different fields of one piece of downlink signaling may be used to activate or deactivate different types of the first target positioning reference signals; or different information in a same field of one piece of downlink signaling may be used to activate or deactivate different types of the first target positioning reference signals, where the downlink signaling includes: the first DCI or the first MAC CE.

In the foregoing possible implementations, at least one of the following conditions is satisfied in a case that there are a plurality of first DCIs:
(1) first DCI for activation of switching to a target BWP is not later than first DCI for activating the first target positioning reference signal;
(2) no BWP switching command is allowed between transmission of the first DCI for activating the first target positioning reference signal and transmission of the first target positioning reference signal;
(3) first DCI for activation of switching to a target BWP or target carrier is not later than a first target positioning reference signal on the BWP or carrier in a case that the first target positioning reference signal activated exists on a plurality of target BWPs or target carriers; or
(4) DCI for activating a target MG is not later than the first target positioning reference signal in a case that the first target positioning reference signal activated exists on one or more target frequency layers.

In a possible implementation, the positioning reference signal activation request information may also be contained in the first MAC CE. Optionally, the first MAC CE includes at least one of the following:
(1) ID information of the first target positioning reference signal, where the ID information of the first target positioning reference signal includes but is not limited to: TRP ID; serving cell ID; positioning reference signal resource set (Set) ID, positioning reference signal resource ID (ResourceID), and frequency layer indicator;
(2) the first target positioning reference signal resource ID;
(3) the first target positioning reference signal resource set ID;
(4) indication information of first activation state information of the first target positioning reference signal;
(5) indication information of second activation state information of the first target positioning reference signal;
(6) positioning reference signal resource setting ID of the first target positioning reference signal;
(7) positioning reference signal reporting setting ID of the first target positioning reference signal;
(8) a seventh bit string, where every n bits in the seventh bit string correspond to different first activation state information, a value of the n bits is for activating the first target positioning reference signal for the corresponding first activation state information, and the seventh bit string is k times n in length, n and k being integers greater than 0;
(9) an eighth bit string, where every m bits in the eighth bit string correspond to different second activation state information, a value of the m bits is for activating reporting of the second target positioning reference signal for the corresponding second activation state information, and the eighth bit string is p times m in length, m and p being integers greater than 0;
(10) a ninth bit string used to indicate first time domain offset information of the first target positioning reference signal;
(11) a tenth bit string used to activate or switch to a second target configuration window, where the second target configuration window is associated with a first configuration window;
(12) frequency layer indication information;
(13) a BWP ID;
(14) a target MG ID;
(15) a pattern ID;
(16) length of a target MG;
(17) a slot offset of a target MG;
(18) a TCI ID;
(19) a QCL ID; or
(20) spatial direction information.

Optionally, the first MAC CE may further include at least one of the following:

(1) target first activation time information used to indicate a time to activate transmission of the first target positioning reference signal;
(2) target second activation time information used to indicate a time to activate measurement or reporting of the second target positioning reference signal;
(3) a time to activate configuration of a target MG; or
(4) a time to activate a switching to a target BWP.

Optionally, the target first activation time information includes first target time domain offset information. The first target time domain offset information is an offset relative to the first time domain offset information of the first target positioning reference signal or is a subset of the first time domain offset information of the first target positioning reference signal.

Optionally, the target second activation time information includes second target time domain offset information. The second target time domain offset information is an offset relative to the second time domain offset information of the second target positioning reference signal or is a subset of the second time domain offset information of the second target positioning reference signal. Optionally, the first MAC CE may further include absolute time information, and the absolute time information is at least one of the following: serving cell time, or reference cell time, or global time information.

In a possible implementation, the positioning reference signal activation request information may alternatively be contained in first RRC signaling and/or first LPP signaling. Optionally, the first RRC signaling and/or first LPP signaling may include at least one of the following:

activation time information, where the activation time information may be a time to activate transmission, or a time to activate measurement or activate reporting, or a time to activate an MG configuration, or a time to activate BWP switching; and optional activation time information also includes a serving cell/reference cell time, or global time information;

ID information of the first target positioning reference signal, where the ID information includes but is not limited to: positioning reference signal ID, frequency layer indicator information; TRP ID information; resource set or resource ID information; TRP group ID information; first target positioning reference signal group ID information; first target positioning reference signal resource group ID information; first target positioning reference signal resource set ID information; MG ID information; BWP ID information; positioning reference signal resource setting ID, or positioning reference signal reporting setting ID;

activation command information;

configuration information of the first target positioning reference signal, where the configuration information includes re-configuration information, and optionally, the configuration information of the first target positioning reference signal is different from the received configuration information of the first positioning reference signal;

indicating configuration information of a changed first target positioning reference signal, where the configuration information of a changed first target positioning reference signal may be part or all of configuration information of the positioning reference signals. For example, at least the following may be included: period and offset, aperiodic offset, spatial relationship information/TCI/QCL, and bandwidth/carrier/BWP;

indication information of first activation state information of the first target positioning reference signal; or indication information of second activation state information of the first target positioning reference signal.

In this embodiment of this application, information for activating reporting of the second target positioning reference signal in the activation information may include at least one of the following: ID information of the second target positioning reference signal; or target second activation state information. For ease of differentiation, the information for activating reporting of the second target positioning reference signal in the activation information is referred to as reporting activation indication information in the following description.

Optionally, the activation information may further include target reporting related information for activating reporting of the second target positioning reference signal, and the target reporting related information includes at least one of the following:

(1) target reporting resource;
(2) target reporting type;
(3) target report content;
(4) indication information indicating an information type of a target reporting resource, where the indication information is used to indicate reporting of measurement information of a first type or reporting of only measurement information or reporting of measurement information and/or other uplink information. In an application, UE may be configured with different resource sets for reporting location information or measurement information respectively, where the largest bit of the resource set for reporting location information is different from the largest bit of the resource set for reporting measurement information;
(5) priority information of a target reporting resource;
(6) frequency domain information of a target reporting resource; or
(7) second target time domain offset information, where the second target time domain offset information is an offset relative to a second time domain offset or a subset of the second time domain offset information or time domain offset information indicated by report activation information or prescribed by a protocol.

In a possible implementation, the activation information (including the foregoing reporting activation indication information, or reporting activation indication information and target reporting related information) for activating reporting of the second target positioning reference signal is contained in one of the following: second DCI or a second MAC CE or second RRC signaling.

The second DCI and the first DCI may be the same DCI, that is, the same DCI is used to activate transmission of the first target positioning reference signal and to activate reporting of the second target positioning reference signal, or different DCIs may be used. Similarly, the second MAC CE and the first MAC CE may also be the same or different, and the second RRC and the first RRC may also be the same or different, which is not specifically limited in this embodiment.

In a possible implementation, the reporting activation indication information is contained in second DCI, and the second DCI may include:

an eleventh bit string, where every t bits in the eleventh bit string correspond to different second activation state information, a value of the t bits is for activating reporting of the second target positioning reference signal for the corresponding second activation state information, and the eleventh bit string is f times t in length, t and f being integers greater than 0.

Optionally, t may be one of the following:
(1) the number of pieces of second activation state information configured by a network-side device via RRC;
(2) the number of pieces of second activation state information configured by a network-side device via LPP; and
(3) the number of pieces of second activation state information selected by a network-side device via a MAC CE.

Optionally, the second DCI may further include at least one of the following:
(1) a twelfth bit string, where the twelfth bit string indicates reporting of frequency domain information of the measurement information;
(2) a thirteenth bit string, where the thirteenth bit string indicates reporting of priority information of the measurement information; or
(3) a nineteenth bit string, where the nineteenth bit string indicates reporting of time domain information of the measurement information.

In a possible implementation, in a case that the target reporting resource is used only to report the measurement information, a predetermined field in the second DCI indicates the second time domain offset information via at least one of the following:
(1) a fourteenth bit string, where the fourteenth bit string indicates reporting of the second target time domain offset information of the measurement information, for example, indicating which line in a reporting time domain offset list configured by the second target positioning reference signal (for example, reportSlotOffsetList of CSI-RS) is used as the second target time domain offset information;
(2) a fifteenth bit string, where the fifteenth bit string indicates reporting of the second target time domain offset information of the measurement information as corresponding second time domain offset information, that is, the second target time domain offset information is the second time domain offset information in the configuration information of the second target positioning reference signal;
(3) a sixteenth bit string, where in a case that the report activation information is for activating a plurality of second target positioning reference signals simultaneously, the sixteenth bit string is used to indicate largest first time domain offset information and/or largest second time domain offset information corresponding to the plurality of second target positioning reference signals;
(4) a seventeenth bit string, indicating pre-configured uplink resource information (configuregrant) corresponding to the second target positioning reference signal; or
(5) an eighteenth bit string, where in a case that the report activation information is also for activating a second target configuration window, the eighteenth bit string is used to indicate second target time domain offset information of the second target configuration window.

In another possible implementation, in a case that the target reporting resource is also used to report other uplink information in addition to the measurement information, a predetermined field in the second DCI indicates one of the following as the second target time domain offset information of the uplink resource:

(1) a larger one of third target time domain offset information and fourth target time domain offset information, where the third target time domain offset information is time domain offset information of the reporting resource (for example, PUSCH), and the fourth target time domain offset information is first time domain offset information of the second target positioning reference signal or second time domain offset information of the second target positioning reference signal;
(2) pre-allocated time domain offset information of the reporting resource, for example, a slot offset pre-allocated for PUSCH; and
(3) the fourth target time domain offset information.

Optionally, time of a time domain resource of the target reporting resource is not earlier than a transmitting time of a first target positioning reference signal, or not earlier than a sum of the transmitting time of the first target positioning reference signal and a processing time of the first target positioning reference signal.

Optionally, a time domain resource of the target reporting resource is determined by a transmitting time of the second DCI and second target time domain offset information indicated by a predetermined field of the second DCI, for example, a sum of the transmitting time of the second DCI and the second target time domain offset information; or, a time domain resource of the target reporting resource is determined by the 1st or last first target positioning reference signal and second time domain offset information indicated by a predetermined field of the second DCI, or determined by a transmitting time of the second DCI and second target time domain offset and/or second time domain offset information indicated by a predetermined field of the second DCI. For example, a PUSCH time domain resource may be a sum of a DCI time and a time indicated by a predetermined field (Time domain resource assignment) of the second DCI, or a sum of the first PRS or the last PRS activated and a time indicated by the time domain resource assignment.

In this embodiment of this application, the first DCI and the second DCI may be DCIs in predetermined formats, for example, DCI 0_0, DCI 0_1, and DCI 0_2. Or, a DCI format defined solely for positioning may alternatively be used.

In a possible implementation, the second MAC CE includes at least one of the following:
(1) a serving cell ID;
(2) a BWP ID;
(3) indication information of a target reporting resource;
(4) activation information of a pre-configured uplink resource; or
(5) the second target time domain offset information.

In a possible implementation, the reporting activation information of the second target positioning reference signal is configured via one of the following ways:
(1) receiving information for activating reporting of the second target positioning reference signal via DCI of a first predetermined format, and receiving the target reporting related information via DCI of a second predetermined format. For example, activating reporting via DCI in DCI 0_X or DCI 2_X format, and configuring scheduling information via DCI in DCI 0_X or DCI 1_X format;
(2) transmitting or receiving the target reporting related information via a MAC CE, and transmitting or receiving the information for activating reporting of the second target positioning reference signal via another MAC CE, or receiving the information for activating reporting of the second target positioning reference signal via DCI. For example, PUCCH scheduling information may be configured via a MAC CE, and PRS reporting may be activated via one DCI or another MAC CE; and (3) transmitting or receiving the target reporting related information via LPP or RRC, and receiving the information for activating reporting of the second target positioning reference signal via one DCI, or transmitting or receiving the information for activating reporting of the second target positioning reference signal via a MAC CE. For example, PUCCH or configured grant (configured grant) scheduling information may be configured via LPP or RRC, and PRS reporting may be activated via DCI or a MAC CE.

In a possible implementation, before receiving activation information of the first target positioning reference signal and/or the second target positioning reference signal, the method further includes: transmitting, by the terminal, a request message for a positioning reference signal, requesting to activate transmission of the first target positioning reference signal and/or activate reporting of the second target positioning reference signal. That is, the network-side device transmits the first information in the case of a request by the terminal.

Figure 3:
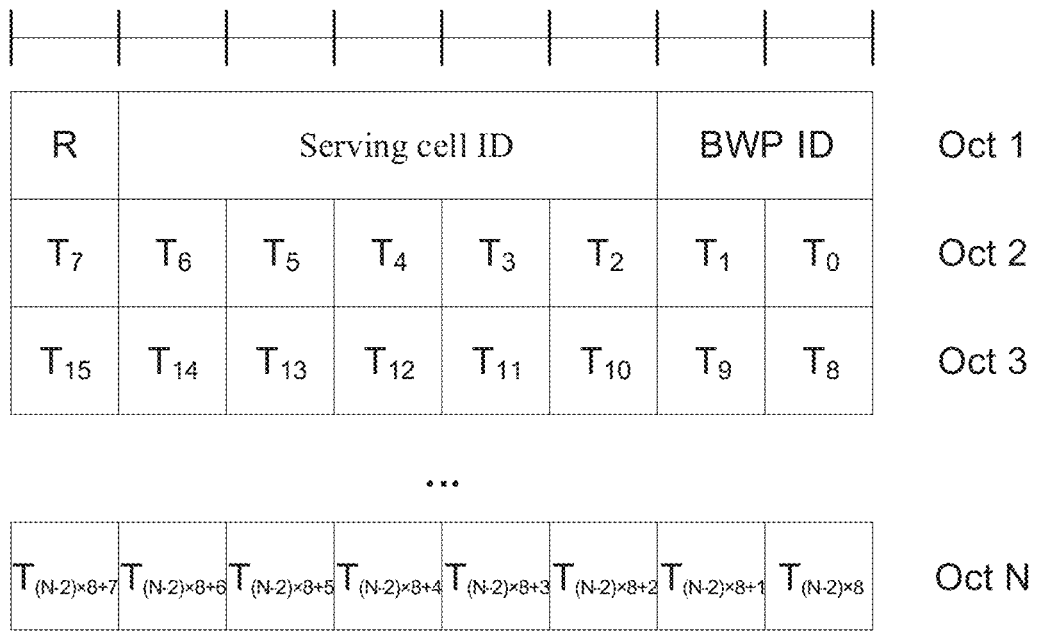
FIG. 3 is a schematic structural diagram of a MAC CE according to an embodiment of this application.
Figure 4:
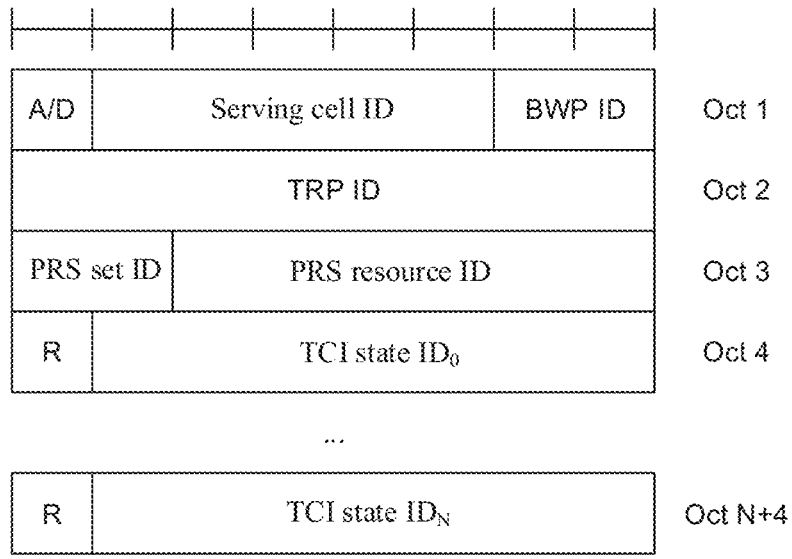
FIG. 4 is a schematic structural diagram of another MAC CE according to an embodiment of this application.
Figures 5, 6:
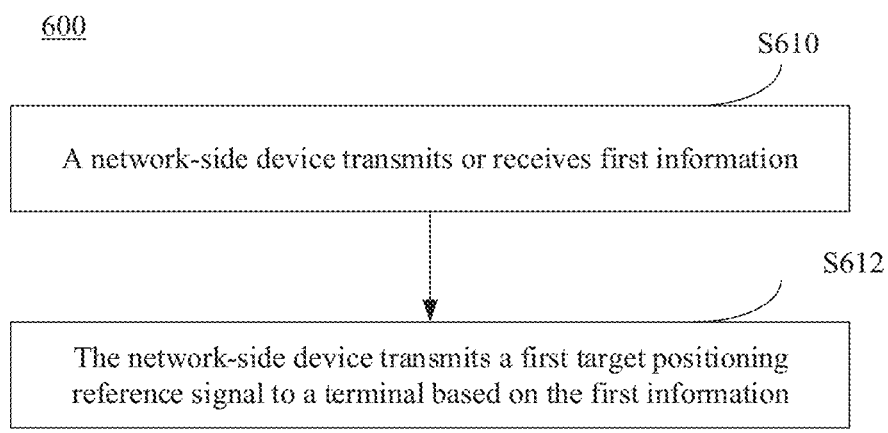
FIG. 5 is a schematic structural diagram of still another MAC CE according to an embodiment of this application.
FIG. 6 is another schematic flowchart of a positioning method according to an embodiment of this application.

In this embodiment of this application, the first MAC CE and the second MAC CE may use the following types:
(1) containing activation state information or corresponding PRS or PRS group information, with a structure as shown in FIG. 3;
(2) containing PRS identification information and TCI information, with a structure as shown in FIG. 4; and
(3) using type selection reported by PUCCH, with a structure as shown in FIG. 5.

In a possible implementation, in a case that the configuration information of the first target positioning reference signal also includes a second threshold time for beam or QCL switching, the receiving and measuring, by the terminal based on the first information, the first target positioning reference signal activated by the positioning reference signal activation request information may include:
determining a first threshold time for beam or QCL switching corresponding to the first target positioning reference signal; and
in a case that a time difference between the activation time of the first target positioning reference signal and the transmitting time of the first target positioning reference signal is less than the first threshold time, selecting first QCL to measure the first target positioning reference signal, where the first QCL includes: QCL of an available PDCCH most recently activated, default QCL, or QCL of the smallest control resource set CORESET.

In the foregoing possible implementation, in a case that the time difference between the activation time of the first target positioning reference signal and the transmitting time of the first target positioning reference signal is less than the first threshold time, the terminal may report a positioning measurement result, where the positioning measurement result includes: indication information reporting QCL configuration failure and/or first QCL information.

In the foregoing possible implementation, the receiving and measuring, by the terminal based on the first information, the first target positioning reference signal activated by the positioning reference signal activation request information may include:
in a case that a time difference between the activation time of the first target positioning reference signal and the transmitting time of the first target positioning reference signal is not less than the first threshold time, using, by the terminal, target QCL to measure the first target positioning reference signal, where the target QCL is QCL of the terminal configured for measuring the first target positioning reference signal.

In a possible implementation, before the terminal transmits or receives the first information, the method further includes: reporting, by the terminal, capability information, where the capability information indicates that a to-be-configured activation time of the positioning reference signal that the terminal expects is not less than the first threshold time. In this possible implementation, the network side may know the capability of the terminal, so that a suitable target QCL can be configured for the terminal, to avoid measurement failure of the positioning reference signal.

In the foregoing possible implementation, the determining a first threshold time for beam or QCL switching corresponding to the first target positioning reference signal may include:
determining the first threshold time according to target information; where the target information includes at least one of the following: a second threshold time of configuration information of beam or QCL switching of the first target positioning reference signal; a pre-agreed third threshold time; or capability information of the terminal.

In this embodiment of this application, optionally, the positioning reference signal may have at least one of the following characteristics:
1. If the positioning reference signal is an aperiodic positioning reference signal, a type of positioning reference signal reporting may only be aperiodic;
2. If the positioning reference signal is a semi-static positioning reference signal, a type of positioning reference signal reporting is semi-static or aperiodic;
3. If the positioning reference signal is an on-demand positioning reference signal, a type of target positioning reference signal reporting is semi-static, aperiodic, or on-demand; or
4. positioning reference signals in the same activation state information or that can be activated by one DCI command have a same time domain type (such as periodic, aperiodic, semi-static, or on-demand).

In this embodiment of this application, optionally, in a case that a bandwidth configured by the first target positioning reference signal is greater than a BWP, the UE may perform one of the following actions:
only measuring first target positioning reference signals in the BWP;
measuring first target positioning reference signals within a MG window; and
performing BWP re-configuration/switching.

Optionally, the activation of the first target positioning reference signal and/or the BWP switching or frequency layer switching may have one of the following characteristics:
performing activation of a positioning reference signal and BWP/frequency layer switching within one DCI;
performing deactivation of a positioning reference signal within one DCI, where during deactivation, it is implicitly indicated that the BWP is switched to a default BWP or an active BWP, or BWP switching may be explicitly indicated;
performing activation of a positioning reference signal and activation of a BWP for positioning within one DCI, where in this case, two active BWPs may simultaneously exist in a cell, and the UE may perform processing based on priorities determined according to an indication of a protocol or network side or perform simultaneous processing;

performing activation of a positioning reference signal and BWP switching within different DCIs, where the DCI for performing BWP switching shall be not later than the DCI for performing activation of the positioning reference signal; and there shall be no BWP switching command between the activation of the positioning reference signal and measurement of the first positioning reference signal, or UE shall not process the BWP switching command;

in a case that no MG is configured, the UE does not expect to process positioning reference signals beyond the active BWP;

the UE does not expect to receive a plurality of pieces of signaling containing a PRS-request in one slot;

having a same BWP/frequency layer for one trigger state (activation state) activated by a PRS-request or having a same BWP/frequency layer for one positioning reference signal resource setting; or having a same BWP/frequency layer for one positioning reference signal reporting setting; and in a case of having a different BWP/frequency layer of the positioning reference signal for one trigger state activated by the PRS-request, the UE may have one of the following actions: requesting a MG or configuring a MG, where optionally, different BWP or frequency layer measurements are supported in the MG; only measuring a positioning reference signal on an active BWP; and requesting reconfiguration.

In a possible implementation, the PRS-request may be used to activate a plurality of UEs to perform positioning reference signal measurement, and UE that requires the measurement blindly checks for DCI with a specific RNTI. If the UE has not detected the DCI carrying a PRS-request in consecutive N slots after transmitting requesting information for a positioning reference signal, or a current positioning reference signal activated by a current PRS-request carried does not meet the requirements of the UE, the UE initiates a new positioning reference signal activation or request.

In a possible implementation, before receiving the first information, the method may further include: reporting, by the terminal, capability information, where the capability information includes at least one of the following:

(1) positioning reference signal types supported by the terminal, for example, aperiodic or semi-static or on-demand PRS, aperiodic or semi-static or on-demand SRS, or a combination of aperiodic/semi-static/on-demand PRS&SRS'

(2) reporting types supported by the terminal, for example, measurement reporting for aperiodic or semi-static or on-demand PRS, aperiodic or semi-static or on-demand SRS, and/or a combination of aperiodic/semi-static/on-demand PRS&SRS;

(3) activation types supported by the terminal; for example, simultaneous activation of PRS and SRS, PRS activation, SRS activation, and PRS&SRS activation;

(4) reporting activation types supported by the terminal; for example, simultaneous reporting of PRS and SRS, PRS reporting, SRS reporting, and PRS&SRS reporting;

(5) whether the terminal supports control via physical layer, RRC, or MAC;

(6) whether the terminal supports configuration via physical layer, RRC, or MAC; or (7) whether the terminal supports activating or deactivating via physical layer, RRC, or MAC.

In the embodiments of this application, the terminal transmits or receives the first information, and performs a positioning operation based on the first information. The first information includes at least one of the following: configuration information of first positioning reference signals or activation information. The configuration information includes at least one of the following: activation state configuration information, reporting state configuration information, first time domain offset information, second time domain offset information, or configuration information of beam or quasi co-location (QCL) switching. The activation information is used to activate transmission of the first target positioning reference signal, and/or the activation information is used to activate reporting of a second target positioning reference signal, where the first target positioning reference signal includes one or more of the first positioning reference signals, and the second target positioning reference signal includes one or more of the first positioning reference signals. In this way, the terminal may obtain configuration information of at least one of the activation state, reporting state, first time domain offset information, second time domain offset information, beam switching, or QCL switching of the positioning reference signal and activate transmission of the first target positioning reference signal and/or reporting of a second target positioning reference signal through the activation information, so that configuration and/or activation of an aperiodic positioning reference signal, a semi-static positioning reference signal, a periodic positioning reference signal, or an on-demand positioning reference signal can be implemented.

FIG. 6 is a schematic flowchart of a positioning method according to an embodiment of this application. The method 600 may be performed by a network-side device. In other words, the method may be performed by software or hardware installed on the network-side device. As shown in FIG. 6, the method may include the following steps.

S610. A network-side device transmits or receives first information.

The first information includes at least one of the following:

configuration information of first positioning reference signals, where the configuration information includes at least one of the following: activation state configuration information, reporting state configuration information, first time domain offset information, second time domain offset information, or configuration information of beam switching or QCL switching; or activation information, for activating transmission of the first target positioning reference signal, and/or for activating reporting of a second target positioning reference signal, where the first target positioning reference signal includes one or more of the first positioning reference signals, and the second target positioning reference signal includes one or more of the first positioning reference signals.

The manner in which the network-side device transmits or receives the first information corresponds to the manner in which the terminal transmits or receives the first information in method 200, and the first information transmitted by the network-side device is the same as the first information received by the terminal and has the same implementations as the possible implementations described in the method 200. Details are not repeated herein.

S612. The network-side device transmits a first target positioning reference signal to a terminal based on the first information.

The network-side device transmits a first target positioning reference signal to the terminal according to configuration information of the first target positioning reference signal and activation information in the first information.

Figure 7:
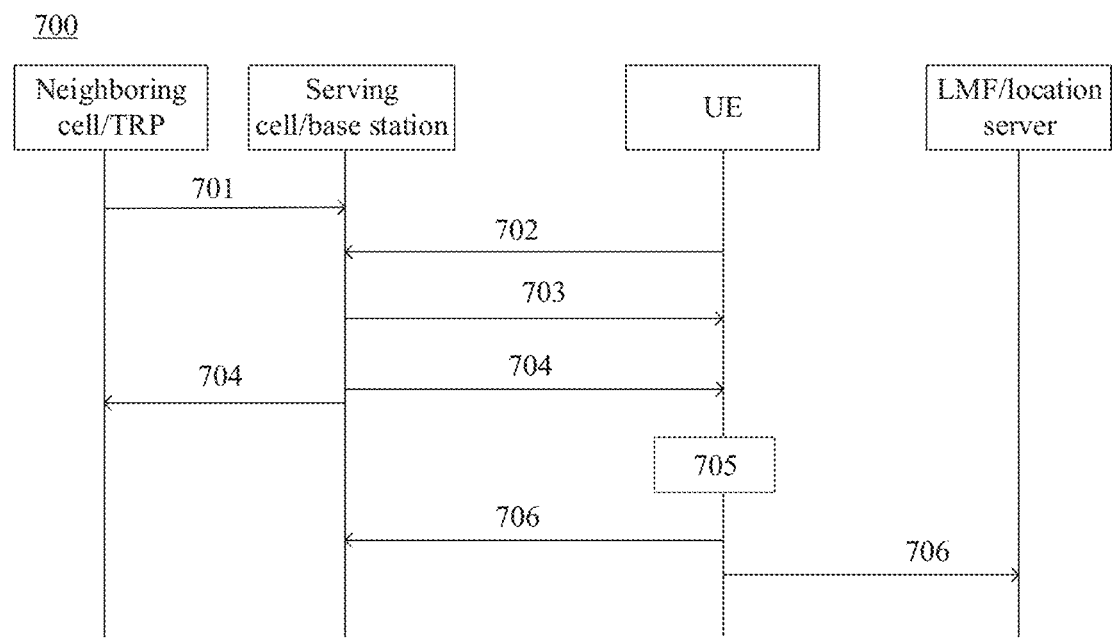
FIG. 7 is another schematic flowchart of a positioning method according to an embodiment of this application.

FIG. 7 is another schematic flowchart of a positioning method provided in an embodiment of this application. The method 700 may be performed by a terminal, a serving cell or base station, or a neighboring cell or TRP. As shown in FIG. 7, the method mainly includes the following steps.

S701. A serving cell or base station collects information about a TRP and/or neighboring cell.

S702. The terminal transmits PRS request information to the serving cell or base station.

S703. The serving cell or base station transmits PRS configuration information to the terminal.

The configuration information may include configuration information of first positioning reference signals in the foregoing method 200 and method 600.

S704. The serving cell or base station transmits a PRS activation indication to the TRP or neighboring cell and transmits activation information to the terminal, to activate PRS measurement or reporting,
where the activation information may be the activation information in the foregoing method 200 and method 600.

S705. The terminal performs PRS measurement or reporting based on the received configuration information and activation information.

S706. The terminal reports measurement information and/or location information to the serving cell or base station, or the terminal may report the measurement information and/or location information to a location management function (LMF) or location server and the LMF or location server may perform location calculation after receiving the measurement information and/or location information.

Figure 8:
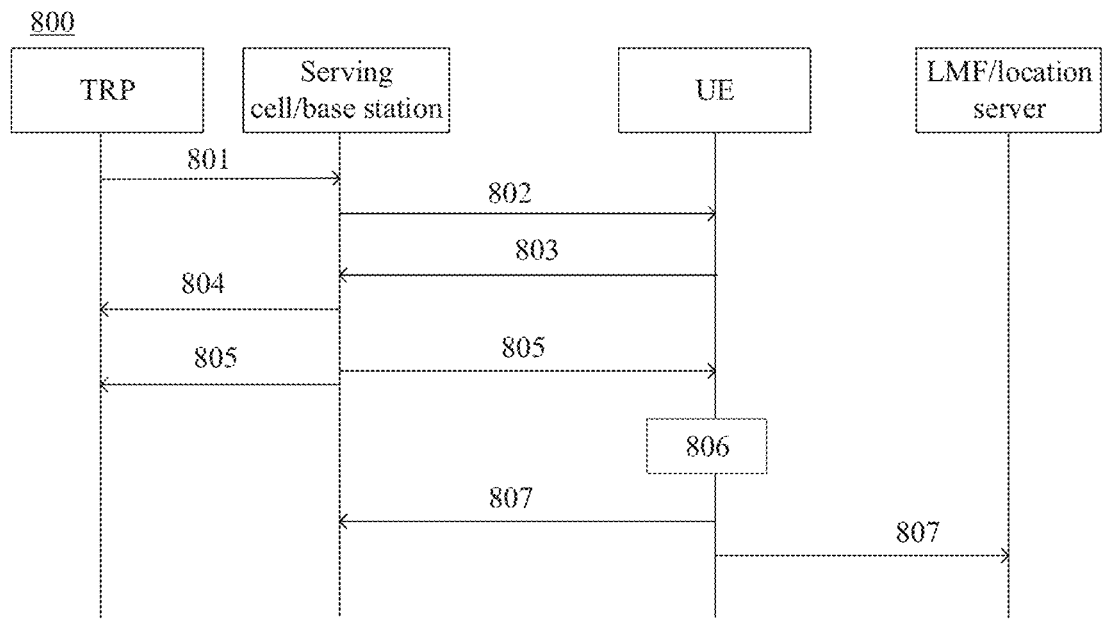
FIG. 8 is another schematic flowchart of a positioning method according to an embodiment of this application.

FIG. 8 is another schematic flowchart of a positioning method provided in an embodiment of this application. The method 800 may be performed by a terminal, a serving cell or base station, or a TRP. As shown in FIG. 8, the method mainly includes the following steps.

S801. A serving cell or base station collects information about a TRP.

S802. The serving cell or base station transmits PRS configuration information to the terminal.

The configuration information may include configuration information of first positioning reference signals in the foregoing method 200 and method 600 and has the same implementations as the possible implementations described in the method 200 and method 600. Details may refer to related descriptions in the method 200 and method 600 and are not repeated herein.

S803. The terminal transmits PRS activation request information to the serving cell or base station.

S804. When receiving the request information for PRS activation from the terminal, the serving cell or base station transmits PRS configuration information to the TRP.

After receiving of the PRS activation request information from the terminal, the serving cell or base station determines that the terminal has positioning requirements and transmits the PRS configuration information to the TRP, so that the TRP can learn about the PRS configuration information of the terminal.

S805. The serving cell or base station transmits a PRS activation indication to the TRP and transmits activation information to the terminal, to activate PRS measurement or reporting.

The serving cell or base station transmits a PRS activation indication to the TRP, activating the TRP to transmit a target positioning reference signal (such as the first target positioning reference signal described in method 200) to the terminal.

The activation information may be the activation information in the foregoing method 200 and method 600 and has the same implementations as the various possible implementations described in the method 200 and method 600. Details may refer to related descriptions in the method 200 and method 600 and are not repeated herein.

S806. The terminal performs PRS measurement or reporting based on the received configuration information and activation information.

S807. The terminal reports measurement information and/or location information to the serving cell or base station, or the terminal may report the measurement information and/or location information to a location management function (LMF) or location server and the LMF or location server may perform location calculation after receiving the measurement information and/or location information.

It should be noted that the positioning method provided in the embodiments of this application may be performed by a positioning apparatus or a control module for performing the positioning method in the positioning apparatus. In the embodiments of this application, the positioning apparatus provided in the embodiments of this application is described by using the positioning apparatus performing the positioning methods as an example.

Figure 9:
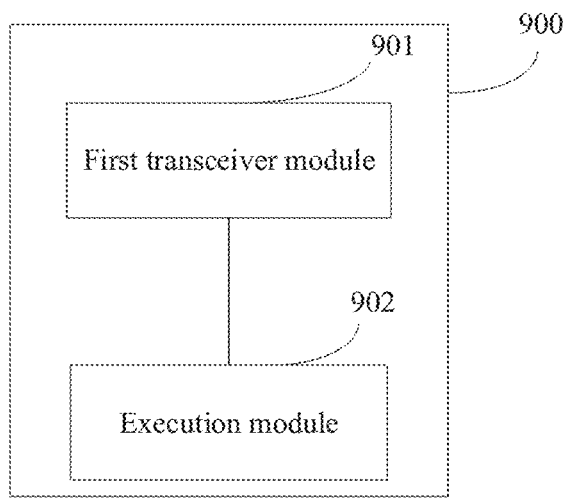
FIG. 9 is a schematic structural diagram of a positioning apparatus according to an embodiment of this application.

FIG. 9 is a schematic structural diagram of a positioning apparatus according to an embodiment of this application. As shown in FIG. 9, the apparatus mainly includes:
 a first transceiver module 901, configured to transmit or receive first information; and
 an execution module 902, configured to perform a positioning operation based on the first information.

The first information includes at least one of the following:
 configuration information of first positioning reference signals, where the configuration information includes at least one of the following: activation state configuration information, reporting state configuration information, first time domain offset information, second time domain offset information, or configuration information of beam switching or QCL switching; or
 activation information, where the activation information is used to activate transmission of a first target positioning reference signal, and/or the activation information is used to activate reporting of a second target positioning reference signal, where the first target positioning reference signal includes one or more of the first positioning reference signals, and the second target positioning reference signal includes one or more of the first positioning reference signals.

The positioning apparatus in this embodiment of this application may be an apparatus, or may be a component, an integrated circuit, or a chip in the terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in the embodiments of this application.

The positioning apparatus in this embodiment of this application may be an apparatus with an operating system. The operating system may be an Android operating system, may be an iOS operating system, or may be another possible operating system. This is not specifically limited in this embodiment of this application.

The positioning apparatus provided in this embodiment of this application is capable of implementing various processes that are implemented by the terminal in the method embodiments of FIG. 2 to FIG. 8, with the same technical effects achieved. To avoid repetition, details are not repeated herein.

Figure 10:
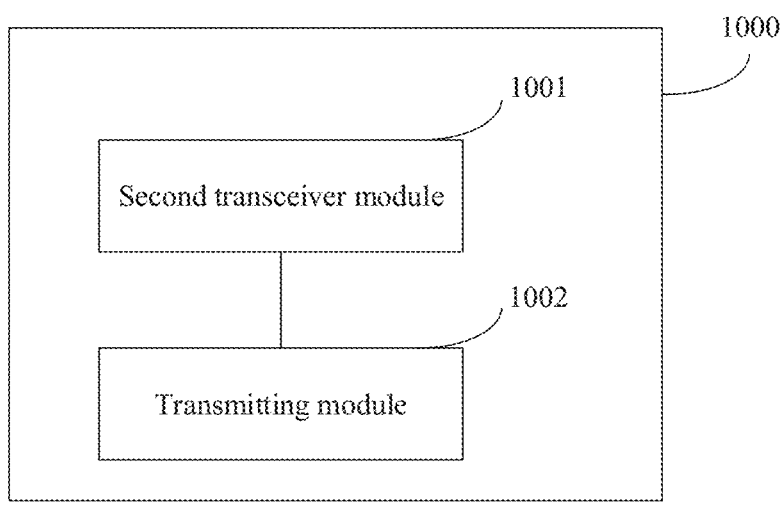
FIG. 10 is another schematic structural diagram of a positioning apparatus according to an embodiment of this application.

FIG. 10 is another schematic structural diagram of a positioning apparatus according to an embodiment of this application. As shown in FIG. 10, the positioning apparatus may include:
- a second transceiver module 1001, configured to transmit or receive first information; and
- a transmitting module 1002, configured to transmit a first target positioning reference signal to the terminal based on the first information.

The first information includes at least one of the following:
- configuration information of first positioning reference signals, where the configuration information includes at least one of the following: activation state configuration information, reporting state configuration information, first time domain offset information, second time domain offset information, or configuration information of beam switching or QCL switching; or
- activation information, for activating transmission of the first target positioning reference signal, and/or for activating reporting of a second target positioning reference signal, where the first target positioning reference signal includes one or more of the first positioning reference signals, and the second target positioning reference signal includes one or more of the first positioning reference signals.

The positioning apparatus provided in this embodiment of this application is capable of implementing various processes that are implemented by the network-side device in the method embodiments of FIG. 2 to FIG. 8, with the same technical effects achieved. To avoid repetition, details are not repeated herein.

Figure 11:
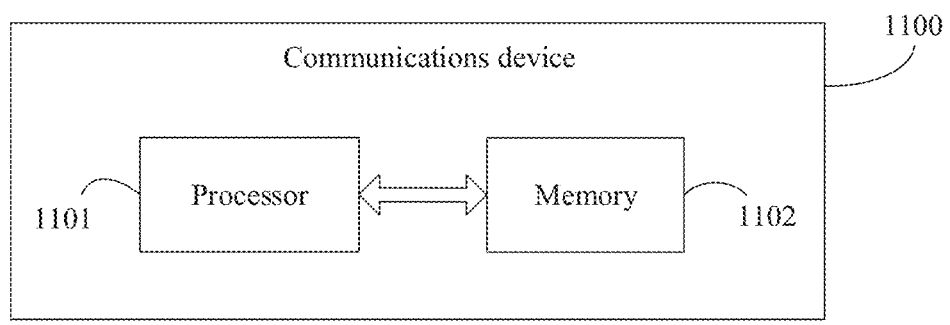
FIG. 11 is a schematic structural diagram of a communications device according to an embodiment of this application.

Optionally, as shown in FIG. 11, an embodiment of this application further provides a communications device 1100, including a processor 1101, a memory 1102, and a program or instructions stored in the memory 1102 and capable of running on the processor 1101. For example, when the communications device 1100 is a terminal, the program or the instructions are executed by the processor 1101 to implement the processes of the foregoing embodiments of the positioning methods, with the same technical effects achieved. When the communications device 1100 is a network-side device, the program or the instructions are executed by the processor 1101 to implement the processes of the foregoing embodiments of the positioning methods, with same technical effects achieved. To avoid repetition, details are not repeated herein.

Figure 12:
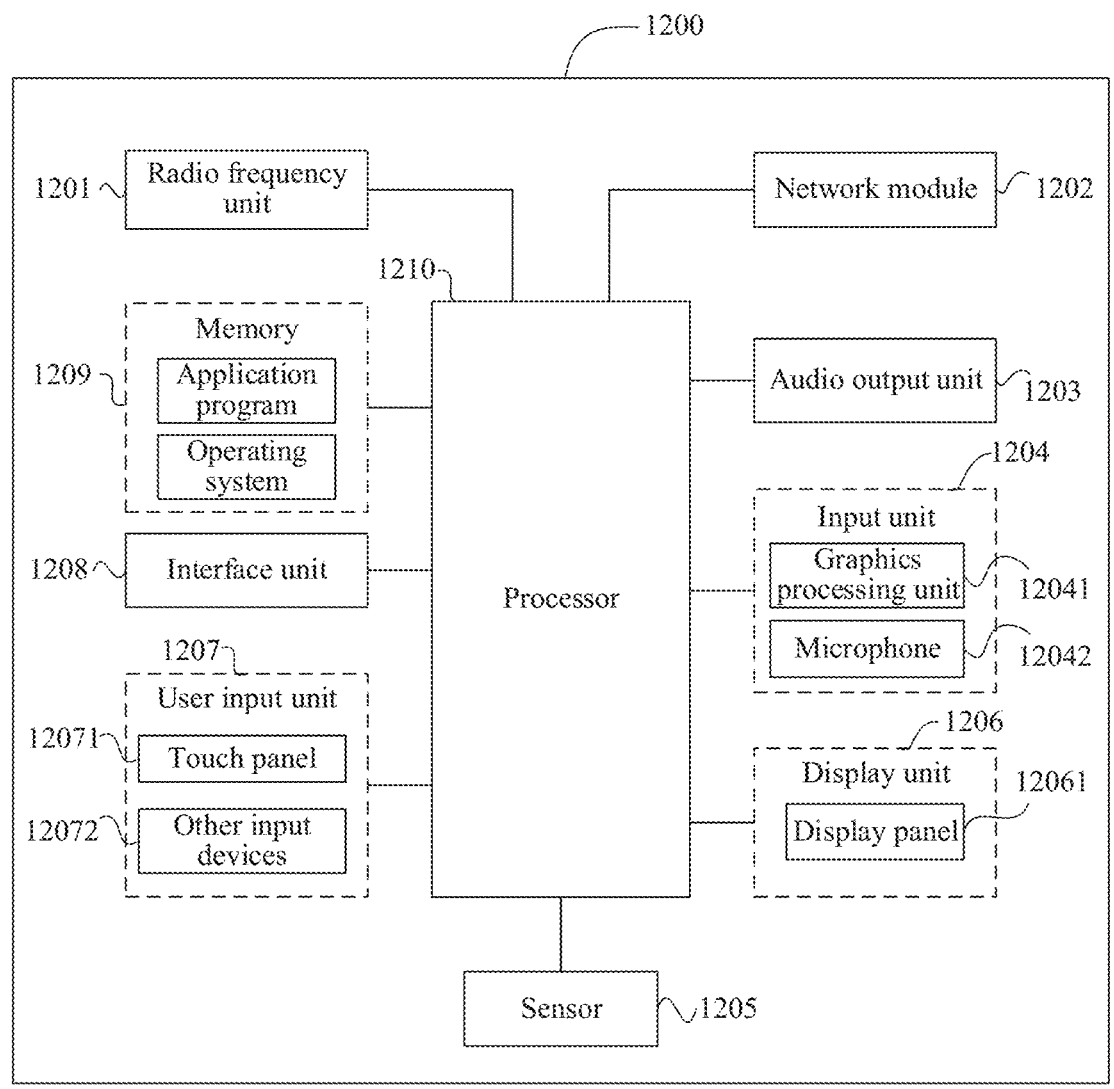
FIG. 12 is a schematic structural diagram of hardware of a terminal according to an embodiment of this application.

FIG. 12 is a schematic diagram of a hardware structure of a terminal for implementing embodiments of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

Those skilled in the art can understand that the terminal 1200 may further include a power supply (for example, a battery) that supplies power to various components. The power supply may be logically connected to the processor 1210 through a power management system, so that functions such as charge and discharge management and power consumption management are implemented by using the power management system. The terminal is not limited to the terminal structure shown in FIG. 12. The terminal may include more or fewer components than shown in the figure, or combine some of the components, or have different arrangements of the components. Details are not described herein.

It should be understood that in this embodiment of this application, the input unit 1204 may include a graphics processing unit (GPU) 12041 and a microphone 12042. The graphics processing unit 12041 processes image data of a static picture or a video that is obtained by an image capture apparatus (for example, a camera) in an image capture mode or a video capture mode. The display unit 1206 may include the display panel 12061. The display panel 12061 may be configured in a form of a liquid crystal display, an organic light-emitting diode display, or the like. The user input unit 1207 includes a touch panel 12071 and other input devices 12072. The touch panel 12071 is also referred to as a touchscreen. The touch panel 12071 may include two parts: a touch detection apparatus and a touch controller. The other input devices 12072 may include but are not limited to a physical keyboard, a function button (for example, a volume control button or a power button), a trackball, a mouse, and a joystick. Details are not described.

In this embodiment of this application, the radio frequency unit 1201 sends downlink information received from a network-side device to the processor 1210 for processing, and in addition, sends uplink data to the network-side device. Generally, the radio frequency unit 1201 includes but is not limited to an antenna, at least one amplifier, a transceiver, a coupler, a low noise amplifier, a duplexer, and the like.

The memory 1209 may be configured to store software programs or instructions and various data. The memory 1209 may mainly include a program or instructions storage area and a data storage area. The program or instructions storage area may store an operating system, an application program or instructions required by at least one function (for example, an audio play function or an image play function), and the like. In addition, the memory 1209 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other non-volatile solid-state storage device.

The processor 1210 may include one or more processing units. Optionally, the processor 1210 may integrate an application processor and a modem processor. The application processor mainly processes an operating system, a user interface, application programs or instructions, and the like. The modem processor mainly processes wireless communication, and for example, may be a baseband processor. It can be understood that the modem processor may be alternatively not integrated in the processor 1210.

The radio frequency unit 1201 is configured to transmit or receive first information.

The processor 1210 is configured to perform a positioning operation based on the first information.

The first information includes at least one of the following:

configuration information of first positioning reference signals, where the configuration information includes at least one of the following: activation state configuration information, reporting state configuration information, first time domain offset information, second time domain offset information, or configuration information of beam switching or QCL switching; or activation information, where the activation information is used to activate transmission of a first target positioning reference signal, and/or the activation information is used to activate reporting of a second target positioning reference signal, where the first target positioning reference signal includes one or more of the first positioning reference signals, and the second target positioning reference signal includes one or more of the first positioning reference signals.

Figure 13:
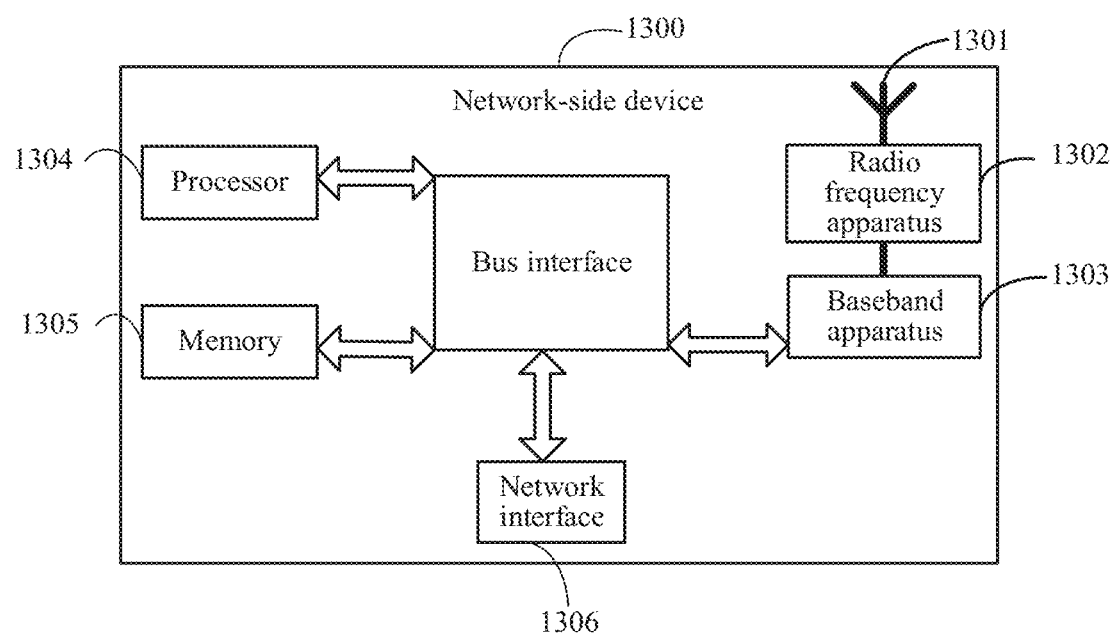
FIG. 13 is a schematic structural diagram of hardware of a network-side device according to an embodiment of this application.

An embodiment of this application further provides a network-side device. As shown in FIG. 13, the network-side device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and transmits the received information to the baseband apparatus 1303 for processing. In a downlink direction, the baseband apparatus 1303 processes to-be-transmitted information, and transmits the information to the radio frequency apparatus 1302; and the radio frequency apparatus 1302 processes the received information and then transmits the information by using the antenna 1301.

The frequency band processing apparatus may be located in the baseband apparatus 1303. The method performed by the network-side device in the foregoing embodiments may be implemented in the baseband apparatus 1303, and the baseband apparatus 1303 includes a processor 1304 and a memory 1305.

The baseband apparatus 1303 may include, for example, at least one baseband processing unit, where a plurality of chips are disposed on the baseband processing unit. As shown in FIG. 13, one of the chips is, for example, the processor 1304, and connected to the memory 1305, to invoke the program in the memory 1305 to perform the operations of the network device shown in the foregoing method embodiment.

The baseband apparatus 1303 may further include a network interface 1306, configured to exchange information with the radio frequency apparatus 1302, where the interface is, for example, a common public radio interface (CPRI).

The network-side device in this embodiment of the present application further includes instructions or a program stored in the memory 1305 and capable of running on the processor 1304. The processor 1304 invokes the instructions or program in the memory 1305 to perform the method performed by the modules shown in FIG. 10, with the same technical effects achieved. To avoid repetition, details are not repeated herein.

An embodiment of this application further provides a non-transitory readable storage medium. The non-transitory readable storage medium stores a program or instructions. When the program or instructions are executed by a processor, the processes of the foregoing embodiments of the positioning method are implemented, with the same technical effect achieved. To avoid repetition, details are not repeated herein.

The processor is the processor of the terminal in the foregoing embodiment. The non-transitory readable storage medium includes a non-transitory computer-readable storage medium such as a read-only memory (ROM), a random access memory (RAM), a magnetic disk, an optical disc, or the like.

An embodiment of this application further provides a chip, where the chip includes a processor and a communications interface. The communications interface is coupled to the processor, and the processor is configured to run a program or instructions of a network-side device to implement the processes of the foregoing embodiments of the positioning methods, with the same technical effects achieved. To avoid repetition, details are not repeated herein.

A computer program product is provided. The computer program product includes a processor, a memory, and a program or instructions stored in the memory and capable of running on the processor, and when the program or instructions are executed by the processor, the processes of the foregoing embodiments of the positioning methods are implemented.

It should be understood that the chip mentioned in the embodiments of this application may also be referred to as a system-level chip, a system chip, a chip system, a system-on-chip, or the like.

It should be noted that the terms "comprise", "include", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, a person of ordinary skill in the art may develop many other manners without departing from principles of this application and the protection scope of the claims, and all such manners fall within the protection scope of this application.

What is claimed is:

1. A positioning method, wherein the method comprises:
receiving, by a terminal, first information; and
performing, by the terminal, a positioning operation based on the first information; wherein
the first information comprises:
 configuration information of first positioning reference signals, wherein the configuration information of the first positioning reference signals comprises at least one of the following: activation state configuration information, reporting state configuration information, first time domain offset information, second time domain offset information, or configuration information of beam switching or quasi-co-location (QCL) switching; the configuration information of the first positioning reference signals further comprises: configuration information of a first configuration window, and the configuration information of the first configuration window comprises at least one of the following:
  the first configuration window of a positioning reference signal indicated by first identification (ID) information;
  start time information of the first configuration window;
  window length information of the first configuration window; or
  period information of the first configuration window;
or
 activation information, for activating measurement or reporting of a second target positioning reference signal, wherein the second target positioning reference signal comprises one or more of the first positioning reference signals;
wherein the activation information comprises at least one of the following:
 a second bit string used to indicate activating a target measurement gap (MG); or
 a sixth bit string used to activate or switch to a first target configuration window, wherein the first target configuration window is associated with the first configuration window; and
wherein the first configuration window includes at least one of the following: a search window, a measurement window, an MG window, or a reporting window.

2. The method according to claim 1,
wherein the activation state configuration information comprises at least one of the following:
at least one piece of first activation state information, wherein one piece of first activation state information is associated with one or more first positioning reference signal groups, wherein a first positioning reference signal group comprises at least one positioning reference signal in the first positioning reference signals;
at least one piece of first activation state information, wherein one piece of first activation state information is associated with first positioning reference signals of one or more first unit resources, wherein a first unit resource comprises at least the following: a positioning reference signal resource, a positioning reference signal resource set, a positioning reference signal resource corresponding to one transmission reception point (TRP), and a positioning reference signal resource corresponding to one frequency layer; or
at least one first activation state list, wherein the first activation state list is used to record an association relationship between the first activation state information and the first positioning reference signal group;
and/or
the reporting state configuration information comprises at least one of the following:
at least one piece of second activation state information, wherein one piece of second activation state information is associated with one or more second positioning reference signal groups, wherein a second positioning reference signal group comprises at least one positioning reference signal in the first positioning reference signals;
at least one piece of second activation state information, wherein one piece of second activation state information is associated with first positioning reference signals corresponding to one or more of the first unit resources; or
at least one second activation state list, wherein the second activation state list is used to record an association relationship between the second activation state information and the second positioning reference signal group.

3. The method according to claim 2, wherein a first positioning reference signal in the first positioning reference signal group and/or a first positioning reference signal in the second positioning reference signal group comprise at least one of the following: an aperiodic positioning reference signal, a semi-static positioning reference signal, a periodic positioning reference signal, or an on-demand positioning reference signal;
or
a positioning reference signal in the first positioning reference signal group and/or a positioning reference signal in the second positioning reference signal group satisfy one of the following:
having a same signal time domain type;
having a same bandwidth part (BWP) ID;
having a same frequency layer;
having a same time domain parameter, wherein the time domain parameter comprises at least one of the following: period, slot offset, muting parameter, or number of repetitions;
belonging to a same positioning reference signal resource set;
belonging to a same active group setting;
having a same group ID;
having a same resource parameter, wherein the resource parameter comprises at least one of the following: beam, beam group, resource set ID, resource ID, or quasi-co-location (QCL) information;
belonging to one or more first unit resources, wherein the first unit resource comprises one of the following: the positioning reference signal resource, the positioning reference signal resource set, the positioning reference signal resource corresponding to one TRP, and the positioning reference signal resource corresponding to one frequency layer;
having a same reporting type;
having a same reporting configuration;
having a same measurement type;
having a same measurement configuration;

having a same reporting group; and
having a same measurement group;
or
one piece of the first activation state information is associated with one or more first positioning reference signal groups, wherein the first positioning reference signal group is associated with one or more first settings, and a first setting comprises: a positioning reference signal reporting setting and/or a positioning reference signal resource setting; and/or one piece of the second activation state information is associated with one or more second positioning reference signal groups, wherein the second positioning reference signal group is associated with one or more second settings, and a second setting is associated with one or a group of first settings.

4. The method according to claim 2, wherein the first activation state list and/or the second activation state list comprises at least one of the following:
a semi-static activation state list, wherein a positioning reference signal in the semi-static activation state list is a semi-static positioning reference signal;
an aperiodic activation state list, wherein a positioning reference signal in the aperiodic activation state list is an aperiodic positioning reference signal; or
an on-demand activation state list, wherein a positioning reference signal in the on-demand activation state list is an on-demand positioning reference signal;
or
the positioning reference signal resource setting comprises one or a group of first unit resources, wherein the first unit resource comprises one of the following: a positioning reference signal resource, a positioning reference signal resource set, a positioning reference signal resource corresponding to one TRP, and a positioning reference signal resource corresponding to one frequency layer;
or
positioning reference signals contained in one positioning reference signal resource set satisfy one of the following:
having a same signal time domain type;
having a same BWP ID;
having a same frequency layer;
having a same time domain parameter, wherein the time domain parameter comprises at least one of the following: period, slot offset, muting parameter, and number of repetitions;
belonging to a same active group setting;
having a same group ID;
having a same resource parameter, wherein the resource parameter comprises at least one of the following: beam, beam group, resource set ID, resource ID, and QCL information;
having a same reporting type;
having a same reporting configuration;
having a same measurement type;
having a same measurement configuration;
having same reporting quality;
having a same reporting group; and
having a same measurement group.

5. The method according to claim 1, wherein the configuration information of first positioning reference signals further comprises at least one of the following:
ID information of a first positioning reference signal, wherein the ID information comprises at least one of the following: frequency layer indicator information; transmission reception point (TRP) ID information; resource set or resource ID information; TRP group ID information; positioning reference signal group ID information; positioning reference signal resource group ID information; positioning reference signal resource set ID information; positioning reference signal reporting setting ID information; measurement gap (MG) ID information; bandwidth part (BWP) ID information; or activation state information;
configuration information corresponding to the ID information, wherein the corresponding configuration information comprises at least one of the following: period; muting parameter; number of repetitions; offset within a period; bandwidth information; frequency domain offset information; time information; spatial direction indication information; transmission configuration indicator (TCI) indication information; quasi-co-location (QCL) indication information; beam indication information; power information; MG configuration information; type of positioning reference signal; BWP information; transmission; stop of transmission;
activation/deactivation flag; numerology; or time offset information;
positioning method indication information;
precision requirement information;
discontinuous reception (DRX) configuration information;
positioning reference signal reporting setting ID;
indication information of whether to be multiplexed with another signal;
configuration information of a multiplexed signal; or
priority indication information of the first positioning reference signal.

6. The method according to claim 1, wherein the configuration information of the first configuration window further comprises at least one of the following:
a first configuration window of a selected positioning reference signal;
configuration information of the positioning reference signal indicated by the first ID information in relation to the first configuration window;
configuration information of a selected positioning reference signal in relation to the first configuration window; or
configuration information of the first positioning reference signal in relation to the first configuration window.

7. The method according to claim 1,
wherein the first time domain offset information comprises at least one of the following:
time domain offset information between activation signaling for first positioning reference signals and a first specified positioning resource, wherein the first specified positioning resource comprises one of the following: a 1st second unit resource of a predetermined first positioning reference signal, any second unit resource of the predetermined first positioning reference signal, and each second unit resource of the predetermined first positioning reference signal, wherein the predetermined first positioning reference signal comprises one of the following: one or a group of positioning reference signals specified in advance in the first positioning reference signals, one or a group of positioning reference signals determined from the first positioning reference signals according to a fixed rule, and one or a group of positioning reference signals determined from the first positioning reference signals prescribed according to a protocol; and the second unit resource comprises one of the following: a positioning reference signal resource, a positioning reference signal resource set, a frequency layer, a positioning reference signal resource setting, a positioning reference signal resource corresponding to one TRP, and a positioning reference signal resource corresponding to an activation state list;

time domain offset information between activation signaling for first positioning reference signals and a second specified positioning resource, wherein the second specified positioning resource is one of the following: any second unit resource of the first positioning reference signals and the 1st second unit resource of any positioning reference signal group, wherein the positioning reference signal group comprises one or more of the first positioning reference signals;

time domain offset information between activation signaling for first positioning reference signals and a third specified positioning resource, wherein the third specified positioning resource comprises one of the following: all second unit resources of any first positioning reference signal and all second unit resources of any positioning reference signal group;

time domain offset information between activation signaling for first positioning reference signals and a fourth specified positioning resource, wherein the fourth specified positioning resource comprises one of the following: all second unit resources of one first positioning reference signal in a serving cell or reference TRP, the 1st second unit resource of one first positioning reference signal in a serving cell or reference TRP, any second unit resource of one first positioning reference signal in a serving cell or reference TRP, all second unit resources of any positioning reference signal group in a serving cell or reference TRP, the 1st second unit resource of any positioning reference signal group in a serving cell or reference TRP, and any second unit resource of any positioning reference signal group in a serving cell or reference TRP; or time domain offset information between activation signaling for first positioning reference signals and a second configuration window, wherein the second configuration window is a subset of a first configuration window, and the first configuration window is a configuration window indicated in configuration information of a first positioning reference signaling.

8. The method according to claim 7, wherein in a case that the predetermined first positioning reference signal is a group of positioning reference signals and that the first specified positioning resource is the 1st second unit resource of the predetermined first positioning reference signal, the first time domain offset information further comprises: time domain offset information of other second unit resources in the predetermined first positioning reference signal relative to the 1st second unit resource; or in a case that the predetermined first positioning reference signal is a group of positioning reference signals and that the first specified positioning resource is any second unit resource of the predetermined first positioning reference signal, the first time domain offset information further comprises: time domain offset information of other second unit resources in the predetermined first positioning reference signal relative to the any second unit resource; or in a case that the second specified positioning resource is the 1st second unit resource of any positioning reference signal group, the first time domain offset information further comprises: time domain offset information of other second unit resources in the any positioning reference signal group relative to the 1st second unit resource; or in a case that the second specified positioning resource is any second unit resource of any positioning reference signal group, the first time domain offset information further comprises: time domain offset information of other second unit resources in the any positioning reference signal group relative to the any second unit resource;

or in a case that the first time domain offset information comprises the time domain offset information between the activation signaling for first positioning reference signals and the fourth specified positioning resource, the first time domain offset information further comprises: offset information of other cells or other TRPs relative to the serving cell or reference TRP, wherein the offset information comprises: time domain offset information and/or a system frame number offset.

9. The method according to claim 1, wherein the second time domain offset information comprises at least one of the following:

time domain offset information between an activation command transmitted for activating first positioning reference signals and a target positioning reference signal report, wherein the target positioning reference signal report is a positioning reference signal report of one or more positioning reference signals in the first positioning reference signals;

time domain offset information between a time at which first positioning reference signals are activated and the target positioning reference signal report; or time domain offset information between an activation command reported for activating first positioning reference signals and the target positioning reference signal report;

or the second time domain offset information comprises at least one of the following:

time domain offset information of a target positioning reference signal report relative to a fifth specified positioning resource, wherein the fifth specified positioning resource comprises one of the following: all third unit resources of one first positioning reference signal, a 1st third unit resource of one first positioning reference signal, any third unit resource of one first positioning reference signal, all third unit resources of one positioning reference signal group, the 1st third unit resource of one positioning reference signal group, and any third unit resource of one positioning reference signal group, wherein the third unit resource comprises one of the following: a positioning reference signal resource, a positioning reference signal resource set, a positioning reference signal resource setting, a positioning reference signal reporting setting, a positioning reference signal resource corresponding to one TRP, a positioning reference signal resource corresponding to one frequency layer, and a positioning reference signal resource corresponding to one activation state information entry, wherein the target positioning reference signal report is a positioning reference signal report of one or more positioning reference signals in the first positioning reference signals;

time domain offset information of the target positioning reference signal report relative to a sixth specified positioning resource, wherein the sixth specified positioning resource comprises one of the following: any third unit resource of one first positioning reference signal in a serving cell or reference TRP, all third unit resources of one first positioning reference signal in a serving cell or reference TRP, the 1st third unit resources of one first positioning reference signal in a serving cell or reference TRP, all third unit resources of one positioning reference signal group in a serving cell or reference TRP, the 1st third unit resource of one positioning reference signal group in a serving cell or reference TRP, and any third unit resource of one positioning reference signal group in a serving cell or reference TRP; or time domain offset information of the target positioning reference signal report relative to a starting point or an ending point of a third configuration window, wherein the third configuration window is a subset of a first configuration window, and the first configuration window is a configuration window indicated in configuration information of a first positioning reference signaling.

10. The method according to claim 9, after receiving the first information, comprising:
in a case that the activation information is for activating reporting of a plurality of first positioning reference signals and that different first positioning reference signals in the plurality of first positioning reference signals are configured with different second time domain offsets, selecting one piece of the second time domain offset information according to a first rule to perform reporting of a positioning reference signal report;
wherein the selecting one piece of the second time domain offset information according to a first rule comprises one of the following:
selecting second time domain offset information indicated in a downlink command received;
selecting second time domain offset information with a largest offset value in a plurality of pieces of the second time domain offset information; and
selecting second time domain offset information with a largest offset value in a plurality of pieces of second time domain offset information indicated in a downlink command received.

11. The method according to claim 1, wherein the activation information is comprised in one of the following: first downlink control information (DCI), a first medium access control control element (MAC CE), first radio resource control (RRC) signaling, and first LTE positioning protocol (LPP) signaling.

12. The method according to claim 11, wherein the first DCI comprises one of the following:
DCI for activation of transmission on a first BWP;
DCI of a predetermined type; and
DCI scrambled by a predetermined radio network temporary ID (RNTI);
wherein the predetermined RNTI is used for any one of the following:
indicating a type of the first target positioning reference signal activated;
indicating an activation state list corresponding to the activation information; and
indicating a corresponding terminal capable of parsing the activation information.

13. The method according to claim 12, wherein the activation information and/or the first DCI comprises at least one of the following:
a first bit string, wherein every n bits in the first bit string correspond to different first activation state information, a value of the n bits is for activating the first target positioning reference signal for the corresponding first activation state information, and the first bit string is k times n in length, n and k being integers greater than 0;
first indication information, wherein the first indication information indicates that the first DCI is for activating the first target positioning reference signal, or the first indication information indicates that the first DCI is for deactivating the first target positioning reference signal;
a third bit string used to indicate activating or switching to a target BWP;
a fourth bit string used to indicate first target time domain offset information of the first target positioning reference signal, wherein the first target time domain offset information is an offset relative to the first time domain offset information of the first target positioning reference signal or is a subset of the first time domain offset information of the first target positioning reference signal; or
a fifth bit string used to indicate a positioning reference signal corresponding to the first target time domain offset information.

14. The method according to claim 11, wherein one or more pieces of downlink signaling are used to activate a plurality of target objects, wherein the downlink signaling comprises: the first DCI or the first MAC CE, and the target objects comprise: the first target positioning reference signal, a target BWP, a target MG, and a first target configuration window;
or
different downlink signaling is used to activate or deactivate different types of first target positioning reference signals; or
different fields of a same piece of downlink signaling are used to activate or deactivate different types of the first target positioning reference signals; or
different information in a same field of a same piece of downlink signaling is used to activate or deactivate different types of the first target positioning reference signals; wherein the downlink signaling comprises the first DCI or the first MAC CE;
or
the first MAC CE comprises at least one of the following:
ID information of the first target positioning reference signal;
ID information of the second target positioning reference signal;
indication information of first activation state information of the first target positioning reference signal;
indication information of second activation state information of the second target positioning reference signal;
a seventh bit string, wherein every n bits in the seventh bit string correspond to different first activation state information, a value of the n bits is for activating the first target positioning reference signal for the corresponding first activation state information, and the seventh bit string is k times n in length, n and k being integers greater than 0;
an eighth bit string, wherein every m bits in the eighth bit string correspond to different second activation state information, a value of the m bits is for activating reporting of the second target positioning reference signal for the corresponding second activation state information, and the eighth bit string is p times m in length, m and p being integers greater than 0;
a ninth bit string used to indicate first time domain offset information of the first target positioning reference signal;
a tenth bit string used to activate or switch to a second target configuration window, wherein the second target configuration window is associated with a first configuration window;
frequency layer indication information;
a BWP ID;
a target MG ID;
a pattern ID;
length of a target MG;
a slot offset of a target MG;
a transmission configuration indicator (TCI) ID;
a QCL ID; or
spatial direction information;
or
the first RRC signaling and/or first LPP signaling comprises at least one of the following:
activation time information, ID information of the first target positioning reference signal, activation command information, configuration information of the first target positioning reference signal, configuration information indicating a changed first target positioning reference signal, indication information of first activation state information of the first target positioning reference signal, ID information of the second target positioning reference signal, indication information of second activation state information of the second target positioning reference signal, a positioning reference signal resource setting ID of the first target positioning reference signal, or a positioning reference signal reporting setting ID of the first target positioning reference signal.

15. The method according to claim 1, wherein the activation information comprises information of at least one of the following for activating reporting of the second target positioning reference signal:
ID information of the second target positioning reference signal; or
target second activation state information;
or
the activation information further comprises target reporting related information for activating reporting of the second target positioning reference signal, and the target reporting related information comprises at least one of the following:
target reporting resource;
target reporting type;
target report content;
indication information indicating an information type of a target reporting resource, wherein the indication information is used to indicate reporting of measurement information of a first type or reporting of only measurement information or reporting of measurement information and/or other uplink information;
priority information of a target reporting resource;
frequency domain information of a target reporting resource; or
second target time domain offset information, wherein the second target time domain offset information is an offset relative to a second time domain offset or a subset of the second time domain offset information or time domain offset information indicated by report activation information or prescribed by a protocol.

16. The method according to claim 11, wherein receiving the activation information, the method further comprises:
transmitting, by the terminal, a request message for a positioning reference signal, requesting to activate transmission of the first target positioning reference signal and/or activate reporting of the second target positioning reference signal.

17. A terminal, comprising a processor, a memory, and a program or instructions stored in the memory and executable on the processor, wherein the program or instructions, when executed by the processor, causes the terminal to perform:
receiving first information; and
performing a positioning operation based on the first information; wherein
the first information comprises:
configuration information of first positioning reference signals, wherein the configuration information of the first positioning reference signals comprises at least one of the following: activation state configuration information, reporting state configuration information, first time domain offset information, second time domain offset information, or configuration information of beam switching or quasi-co-location (QCL) switching;
wherein the configuration information of the first positioning reference signals further comprises: configuration information of a first configuration window, and the configuration information of the first configuration window comprises at least one of the following:
the first configuration window of a positioning reference signal indicated by first identification (ID) information;
start time information of the first configuration window;
window length information of the first configuration window; or
period information of the first configuration window;
or
activation information, for activating measurement or reporting of a second target positioning reference signal, wherein second target positioning reference signal comprises one or more of the first positioning reference signals;
wherein the activation information comprises at least one of the following:
a second bit string used to indicate activating a target measurement gap (MG); or
a sixth bit string used to activate or switch to a first target configuration window, wherein the first target configuration window is associated with the first configuration window; and
wherein the first configuration window includes at least one of the following: a search window, a measurement window, an MG window, or a reporting window.

18. A network-side device, comprising a processor, a memory, and a program or instructions stored in the memory and executable on the processor, wherein the program or instructions, when executed by the processor, causes the network-side device to perform:
transmitting first information; and
transmitting a first target positioning reference signal to a terminal based on the first information; wherein
the first information comprises:
configuration information of first positioning reference signals, wherein the configuration information of the first positioning reference signals comprises at least one of the following: activation state configuration information, reporting state configuration information, first time domain offset information, second time domain offset information, or configuration information of beam switching or QCL switching; wherein the configuration information of the first positioning reference signals further comprises: configuration information of a first configuration window, and the configuration information of the first configuration window comprises at least one of the following:
- the first configuration window of a positioning reference signal indicated by first identification (ID) information;
- start time information of the first configuration window;
- window length information of the first configuration window; or
- period information of the first configuration window;

or
activation information, for activating measurement or reporting of a second target positioning reference signal, wherein the second target positioning reference signal comprises one or more of the first positioning reference signals;
wherein the activation information comprises at least one of the following:
- a second bit string used to indicate activating a target measurement gap (MG); or
- a sixth bit string used to activate or switch to a first target configuration window, wherein the first target configuration window is associated with the first configuration window; and
wherein the first configuration window includes at least one of the following: a search window, a measurement window, an MG window, and a reporting window.

19. The network-side device according to claim 18,
wherein the activation state configuration information comprises at least one of the following:
at least one piece of first activation state information, wherein one piece of first activation state information is associated with one or more first positioning reference signal groups, wherein a first positioning reference signal group comprises at least one of the first positioning reference signals;
at least one piece of first activation state information, wherein one piece of first activation state information is associated with first positioning reference signals of one or more first unit resources, wherein a first unit resource comprises at least the following: a positioning reference signal resource, a positioning reference signal resource set, a positioning reference signal resource corresponding to one TRP, and a positioning reference signal resource corresponding to one frequency layer;
at least one first activation state list, wherein the first activation state list is used to record an association relationship between the first activation state information and the first positioning reference signal group;
and/or
the reporting state configuration information comprises at least one of the following:
at least one piece of second activation state information, wherein one piece of second activation state information is associated with one or more second positioning reference signal groups, wherein a second positioning reference signal group comprises at least one of the first positioning reference signals;
at least one piece of second activation state information, wherein one piece of second activation state information is associated with first positioning reference signals of one or more of the first unit resources; and
at least one second activation state list, wherein the second activation state list is used to record an association relationship between the second activation state information and the second positioning reference signal group.

20. The network-side device according to claim 18, wherein the configuration information of the first positioning reference signal further comprises at least one of the following:
ID information of a first positioning reference signal, wherein the ID information comprises at least one of the following: frequency layer indicator information; transmission reception point TRP ID information; resource set or resource ID information; TRP group ID information; positioning reference signal group ID information; positioning reference signal resource group ID information; positioning reference signal resource set ID information; positioning reference signal reporting setting ID information; measurement gap MG ID information; and bandwidth part BWP ID information;
configuration information corresponding to the ID information, wherein the corresponding configuration information comprises at least one of the following: period; muting parameter; number of repetitions; offset within a period; bandwidth information; frequency domain offset information; time information; spatial direction indication information; transmission configuration indicator TCI indication information; quasi-co-location QCL indication information; beam indication information; power information; MG configuration information; type of positioning reference signal; BWP information; transmission; stop of transmission; activation/deactivation flag; numerology; and time offset information;
positioning method indication information;
precision requirement information;
discontinuous reception DRX configuration information;
positioning reference signal reporting setting ID;
indication information of whether to be multiplexed with another signal;
configuration information of a multiplexed signal; or
priority indication information of the first positioning reference signal; wherein
the configuration information of the first configuration window further comprises at least one of the following:
a first configuration window of a selected positioning reference signal;
configuration information of the positioning reference signal indicated by the first ID information in relation to the first configuration window;
configuration information of a selected positioning reference signal in relation to the first configuration window;
configuration information of the first positioning reference signal in relation to the first configuration window; or
configuration information of the selected positioning reference signal in relation to the first configuration window.

\* \* \* \* \*